(12) United States Patent  
Baxter et al.

(10) Patent No.: US 8,757,094 B2  
(45) Date of Patent: Jun. 24, 2014

(54) AUTOMATED LITTER DEVICE AND METHOD

(71) Applicant: Automated Pet Care Product, Inc., Pontiac, MI (US)

(72) Inventors: Brad Baxter, Bloomfield Hills, MI (US); Jason Smith, West Bloomfield, MI (US)

(73) Assignee: Automated Pet Care Product, Inc., Pontiac, MI (US)

( * ) Notice: Subject to any disclaimer, the term of this patent is extended or adjusted under 35 U.S.C. 154(b) by 0 days.

(21) Appl. No.: 13/804,370

(22) Filed: Mar. 14, 2013

(65) Prior Publication Data

US 2013/0333625 A1 Dec. 19, 2013

Related U.S. Application Data

(60) Provisional application No. 61/661,078, filed on Jun. 18, 2012.

(51) Int. Cl.  
*A01K 1/01* (2006.01)  
*A01K 29/00* (2006.01)

(52) U.S. Cl.  
USPC ........... 119/166; 119/161; 119/163; 119/165; 119/168

(58) Field of Classification Search  
USPC .......................... 119/161, 163, 165, 166, 168  
See application file for complete search history.

(56) References Cited

U.S. PATENT DOCUMENTS

| 4,096,827 | A |   | 6/1978 | Cotter |        |
|-----------|---|---|--------|--------|--------|
| 4,120,264 | A | * | 10/1978 | Carter | 119/166 |
| 4,886,014 | A |   | 12/1989 | Sheriff |        |
| 5,048,464 | A | * | 9/1991 | Shirley | 119/166 |
| 5,107,797 | A | * | 4/1992 | LaRoche | 119/166 |
| 5,477,812 | A | * | 12/1995 | Waters | 119/163 |
| 5,509,379 | A | * | 4/1996 | Hoeschen | 119/166 |
| 5,551,375 | A | * | 9/1996 | Flores | 119/166 |
| 5,622,140 | A | * | 4/1997 | McIlnay-Moe | 119/166 |
| 5,662,066 | A | * | 9/1997 | Reitz | 119/163 |
| 5,752,465 | A | * | 5/1998 | Page | 119/166 |
| 6,055,935 | A |   | 5/2000 | Engel |        |
| 6,082,302 | A |   | 7/2000 | Thaler et al. |   |
| 6,126,015 | A | * | 10/2000 | Haymaker | 209/235 |
| 6,463,881 | B1 | * | 10/2002 | Reitz | 119/163 |
| 6,851,386 | B2 |  | 2/2005 | Northrop et al. |  |
| 7,137,355 | B1 | * | 11/2006 | Wan | 119/166 |
| 7,198,006 | B2 |  | 4/2007 | Fischer |        |
| 7,278,372 | B2 | * | 10/2007 | Colsky | 119/166 |
| 7,487,742 | B2 | * | 2/2009 | Waters | 119/166 |
| 7,647,889 | B2 |  | 1/2010 | Horanoff |       |
| 7,762,231 | B2 |  | 7/2010 | Dugas et al. |    |
| 7,798,101 | B2 | * | 9/2010 | Waters | 119/166 |
| 8,413,608 | B2 | * | 4/2013 | Sharp et al. | 119/166 |
| 8,475,367 | B1 | * | 7/2013 | Yuen et al. | 600/300 |
| 8,544,418 | B2 | * | 10/2013 | Jiang et al. | 119/476 |

* cited by examiner

*Primary Examiner* — Kimberly Berona  
*Assistant Examiner* — Michael Wang  
(74) *Attorney, Agent, or Firm* — The Dobrusin Law Firm, PC

(57) ABSTRACT

A device comprising: a support base and an chamber, located on the support base, having an entry opening so that an animal can enter and exit the chamber; wherein the chamber includes an axis of rotation that forms an angle of about 80 degrees or less with a vertical plane.

16 Claims, 12 Drawing Sheets

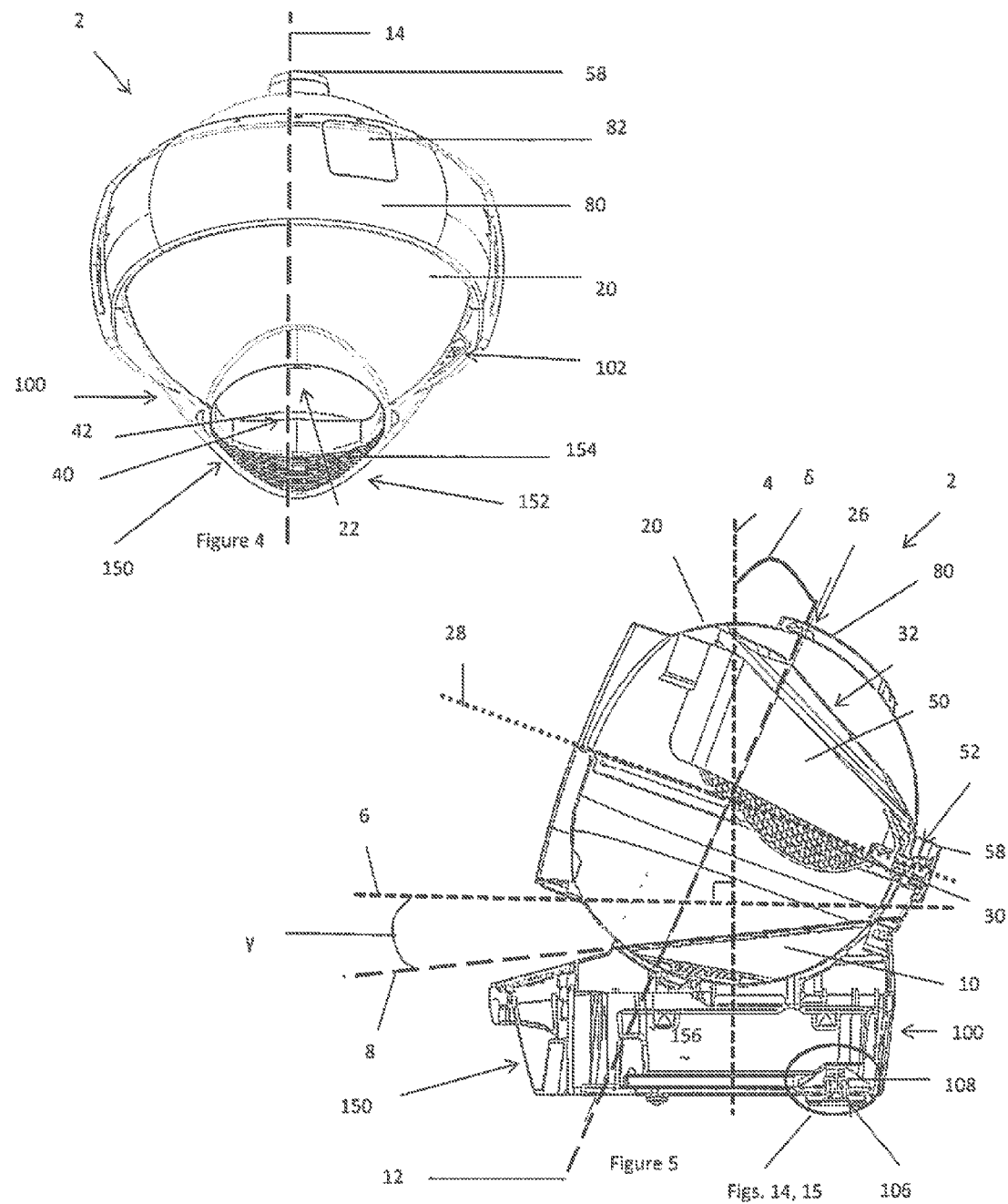

AUTOMATED LITTER DEVICE AND METHOD

FIELD

The present teachings generally relate to an improved litter device for use by animals that automatically removes animal waste from litter.

BACKGROUND

The present teachings are predicated upon providing an improved litter device, and specifically an improved automatic litter device. There are numerous different litter box designs available on the market. Many of these designs are manual and require an owner to sift waste from litter so that the litter is cleaned. With these manual designs, owners may forget to clean the waste from the litter and the litter box may become full, may begin to smell, or both. For these reasons and many other, owners have begun to purchase automated litter boxes. Generally, these devices include a portion that holds litter, and a portion that receives waste that is removed from the portion that holds litter so that owner interaction is reduced and the frequency of manual interaction to remove waste is reduced. Many of these devices include a rake that travels along a track and removes waste from the litter. These automated rakes may get stuck, clumps of waste and/or litter may stick to the rake and/or the floor, the rake may become dislodged, the rake may not move the waste all the way out of the portion that holds the litter, or a combination thereof. Other devices rotate and sift the waste from the litter so that the clean litter is retained in the portion that holds the litter and the waste is emptied into the portion that receives the waste. Many of these devices are covered so that dust, smells, litter, or a combination thereof are retained within the litter box. However, covering the litter box reduces the amount of space available for the pet, the amount of light in the litter box, these covers through use may become dirty through contact with waste, or a combination thereof. Further, the cover and/or walls may become contaminated as waste travels along the walls to an exit point such that when an animal subsequently enters the device contaminants from the walls may be transferred to the animal.

Examples of some automated litter boxes may be found in U.S. Pat. Nos. 4,096,827; 4,886,014; 5,107,797; 5,662,066; 6,055,935; 6,082,302; 6,126,015; 6,463,881; 6,851,386; 7,198,006; 7,762,231; and 7,647,889; all of which are incorporated by reference herein for all purposes.

It would be attractive to have a litter device that is covered and provides adequate space for animals so that when inside the animals can move around. It would be attractive to have a litter device that is illuminated so that the animal can see while inside the litter device. It would be attractive for the litter device to prevent transfer of waste remnants to an animal in the litter device. What is needed is a device that is self-contained so that an animal cannot contact any of the moving parts. What is further needed is a device that includes safety devices so that if an animal comes into contact with any parts that may move the device stops so that the animal is prevented from being caught, pinched, injured, or a combination thereof. It would be attractive to have a weight sensor that measures small changes in mass of the device by measuring a small range of forces indirectly

SUMMARY

The present teachings meeting one or more, if not all, of the present needs by providing: a device comprising one or more of the following features: a chamber with an axis of rotation that forms an angle of about 80 degrees or less with a vertical plane; a track around the chamber that forms an angle of between about 10 degrees and 40 degrees with the vertical plane; a bonnet that extends over the chamber and is attached to a support base on one or both sides; a shield located within and is movably attached to the chamber so that the chamber at least partially rotates around the shield and so that the shield covers an internal surface of the chamber; an indicator that monitors the level of waste in the waste drawer so that when the level reaches a predetermined level the chamber is prevented from being rotated; a weight detection sensor, located in the support base and below the chamber, having an expandable and contractible member such as a spring, and a force sensitive monitoring device such as a force sensitive resistor placed between a rocker arm and the support base, so that as compression of the expandable and contractible member changes, the force sensitive member measures a change in weight of the device; a step and cleaning device on the waste drawer so that an animal can use the step to enter and exit the chamber and litter is caught in the cleaning device; an entry lip on an entry opening of the chamber; an electronics compartment in the support base; an isolated mount for housing mechanical parts, electrical parts, or both; a stop so that the chamber will stop at the waste dumping position in the event of a sensor failure; a pinch detector so that items do not get pinched between the support base and the chamber during rotation of the chamber; and a screen and septum that are connected by a living hinge.

The present teachings meet one or more of the present needs by providing a device comprising: a support base and a chamber, located on the support base, having an entry opening so that an animal can enter and exit the chamber; wherein the chamber includes an axis of rotation that forms an angle of about 80 degrees or less with a vertical plane.

One unique aspect of the present teachings include a device comprising: a support base; a chamber, located on the support base, wherein the support base includes, an entry opening so that an animal can enter and exit the chamber, a waste opening so that contents can be emptied from the chamber; and a bonnet that extends over the chamber and is attached to the support base on one or both sides; wherein the bonnet covers the waste opening so that during rotation of the chamber a pinch condition is prevented between the waste opening and the support base.

Another unique aspect of the present teachings include a device comprising: a support base; a chamber, located on the support base, wherein the support base includes, an entry opening so that an animal can enter and exit the chamber, a shield located within and attached to the chamber wherein the shield is movably attached to the chamber so that the chamber at least partially rotates around the shield and after rotation of the chamber an internal surface of the chamber is covered.

Another unique aspect of the present teachings include a device comprising: a chamber having an entry opening so that an animal can enter and exit the chamber, a support base, located under and supporting the chamber, wherein the support base includes, a waste drawer and an indicator that monitors a level in the waste drawer so that when the level reaches a predetermined level the chamber is prevented from being rotated.

Yet another unique aspect of the present teachings includes a device comprising: a chamber having an entry opening so that an animal can enter and exit the chamber, a support base, located under and supporting the chamber, including a weight detection sensor, located in the support base and below the chamber, having an expandable and contractible member such as a spring, and a force sensitive monitoring device such as a resistor placed between a rocker arm and the support base, so that as compression of the expandable and contractible member changes the force sensitive monitoring device measures a change in weight of the device The teachings herein surprisingly solve one or more of these problems by providing a litter device that is covered and provides adequate space for animals to move around inside of the litter device. The litter device as taught herein may be illuminated so that the animal can see while inside the litter device. The litter device as taught herein includes an internal shield for covering an internal wall of the litter device so that any remnants on the walls of the device are covered and are not transferred to an animal in the litter device. The device is self-contained so that an animal cannot contact any of the moving parts. The device includes safety devices so that if an animal comes into contact with any parts that may move the device stops so that the animal is prevented from being caught, pinched, injured, or a combination thereof. The weight sensor taught herein measures small changes in mass of the device while measuring a small range of forces.

BRIEF DESCRIPTION OF THE DRAWINGS

FIG. 4 illustrates a top view of the litter device of FIG. 1;

FIG. 5 illustrates a cross-sectional view of the litter device of FIG. 1;

DETAILED DESCRIPTION

Figure 1:
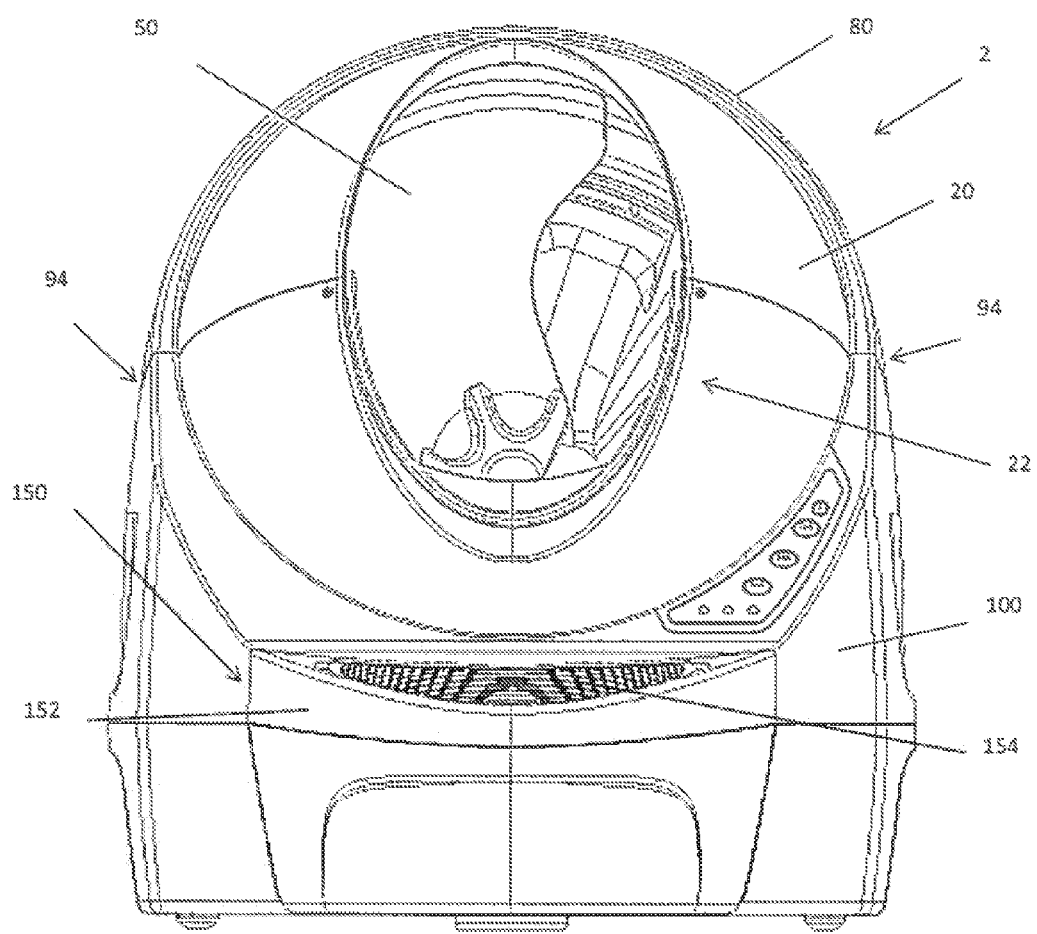
FIG. 1 illustrates a front view of one possible litter device.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The device may be any device that includes litter for use by an animal. The device may be used by any domesticated animal such as a pig, dog, cat, rabbit, or a combination thereof. The device may include one or more of the following features: a support base, a chamber, an axis of rotation that forms an angle of 80 degrees or less with a vertical plane, a track around the chamber, a track plane that forms an angle of between about 10 degrees and 40 degrees with the vertical plane, an elongated entry opening in the chamber, a bonnet, a light sensor on the control panel, an interlock sensor on the bonnet, a shield in the chamber, a waste drawer, an indicator that monitors the level in the waste drawer, a weight detection sensor, a pre-compressed member, a force sensitive monitoring device, a step on a waste drawer, a cleaning device, an entry lip, an electronics compartment, an isolated mount, a stop, a diverter, a pinch detector, a screen, a septum, a living hinge, or a combination thereof. Preferably, the device may be designed for use by a cat. The device includes at least a support base and a chamber on the support base.

The support base may be any device that supports a chamber. The support base may be any size and shape so that the support base moves or assists in moving a chamber. The support base may be any size, shape, configuration, or a combination thereof so that the support base houses a portion of and/or all of the mechanical componentry and rotates the chamber. The support base may rest on a surface such as a table, a floor, some other substantially planar surface, or a combination thereof so that the support base supports a chamber. The support base may be substantially planar. Preferably, the support base may be flat and reside in one plane. The support base may form another surface so that the support base forms a cradle. For example, the support base may include a central portion and one or more support members that extend away from the central portion. The central portion and one or more support members may form a "U" shape. Preferably, the one or more support members may extend vertically away from the central portion. More preferably, the support base may include two support members that extend from a central portion of the support base so that a chamber is cradled between the support members. The support base may include one or more controls. The support base may include a control panel. Preferably, the one or more controls, the control panel, or both are located on one of the support members.

The control panel may include any control so that an owner may operate the litter device. The control panel may include a reset button, a cleaning cycle button, an empty button, an on/off switch, a waste level indicator, an advance button to partially rotate the chamber, a light sensor, or a combination thereof. The control panel may be used when litter is added to the chamber. For example, when litter is added the owner may press a reset button and/or a litter add button so that the weight sensor begins creating a new baseline as discussed herein and/or a cleaning cycle is not triggered. The control panel may include an empty button so that an owner may remove all of the litter from the chamber. For example, when the empty button is pressed the chamber may rotate in a direction opposite to that of a cleaning cycle so that the litter is not stored in the septum and may instead be removed from the chamber via the waste opening. The control panel may be made of any material so that the controls are protected. The control panel may include one main covering over all of the buttons so that any liquids and/or solids do not damage the controls. The control panel may be a cover.

The control panel may be located adjacent one or more compartments. The control panel may cover one or more compartments. The support base may include one or more compartments for housing one or more electronic components that operate the device. The electronic components may be any components that may be damaged when contacted with moisture, vapor, fumes, or a combination thereof. The electronic components housed in the one or more compartments may be wires, terminations, switches, metal clips, motors, circuit boards, sensors, the like, or a combination thereof. The one or more components may include a cover that seals and/or substantially seals the electronic components in the one or more compartments. The cover may be a control panel. The compartments may be substantially sealed so that moisture, vapor, fumes, or a combination thereof are prevented from entering the one or more compartments and damaging the electronic components. The compartments may be sealed in any way so that moisture, vapor, fumes, or a combination thereof are substantially prevented from entering the compartment and damaging the electronic components housed in the compartment. The one or more compartments may include one or more ports, preferably one for wires, connectors, cables, or a combination thereof to pass through so that power, signals, or both may pass in and/or out of the compartments. The port may extend through a cover, a wall, a base portion, a gap, or a combination thereof in the support base. The wires, connectors, cables, or a combination thereof may be substantially surrounded by a plug so that the wires are compressed together and the plug fills the port through which the wires, connectors, cables, or a combination thereof pass through. The plug may be a soft plug, a hard plug, or both. The plug may form a semi-seal plugging the port so that moisture, vapor, fumes, or a combination thereof are substantially prevented from entering the compartment. The plug may form a complete seal so that moisture, vapor, fumes, or a combination thereof are substantially prevented from entering the compartment. The wires, connectors, cables, or a combination thereof may attach to one or more controls for controlling the device.

The one or more compartments, the one or more covers, or both may include a port so that a drive may extend from a motor into contact with a chamber so that the chamber may be rotated by the motor. The port may be large enough so that the drive may extend out of the compartment, through the cover, or both so that the chamber may be rotated. The drive may be any drive mechanism capable of moving, rotating, or both the chamber. The drive mechanism may include a cog, a sprocket, a belt, a direct drive, or a combination thereof. The cover, the compartment, or both may isolate the drive so that the drive may contact the chamber but any moisture, vapor, fumes, or a combination thereof from inside the support base may be prevented from entering the compartment. The drive may be made of any material that is resistant to moisture, vapor, fumes, or a combination thereof. The drive may be made of any material that is strong enough so that the drive may rotate the chamber. Examples of materials that may be used for the drive include rubber, plastic, metal, ceramic, or a combination thereof. The drive may be made of the same material as the chamber, the support base, or both. The drive is made of a material that may be molded and preferably injection molded. More preferably, the drive is made of nylon. The one or more compartments may house one or more motors, or more gear assemblies, or both.

The one or more motors, one or more gear assemblies, or both may be housed in the one or more compartments using one or more isolated mounts. The isolated mount may be any device that holds a motor, a gear assembly, or both. Preferably, the isolated mount may be any device that holds a motor, a gear assembly, or both at the same angle as the chamber as taught herein. For example, if the chamber forms an angle of about 70 degrees with vertical then the isolated mount will form an angle of about 70 degrees with vertical and the respective motor, gear assembly, or both will accordingly form an angle of about 70 degrees with vertical. The isolated mount may be an integral part, an additional part, or both. The isolated mount may include a part that is integrally created when the support base is created. The isolated mount may include a part that substantially surrounds, completely surrounds, sandwiches, houses, or a combination thereof of a motor, a gear assembly, or both and then assists in mounting the motor, the gear assembly, or both in the isolated mount. Preferably, at least a portion of the isolated mount is a soft and flexible component that sandwiches the motor, the gear assembly, or both and assists in holding the motor, the gear assembly, or both in the compartment of the support base. The isolated mount may be made of plastic, metal, rubber, ceramic, a polymer, a natural material, a synthetic material, or a combination thereof. The isolated mount may be made of any material that may be molded, preferably injection molded. All or a portion of the isolated mount may be made of the same material as the chamber, the support base, or both. All or a portion of the isolated mount may be made of a dampening material. For example, the isolated mount may include a glove portion that surrounds all or a portion of the motor, the gear assembly, or both so that any noise, vibration, or both of the motor, the gear assembly, or both are reduced, eliminated, or both. All or a portion of the isolated mount may be made of a material that reduces and/or eliminates any gap and/or tolerance between internal walls of an integral portion of the isolated mount. For example, the motor, the gear assembly, or both may be smaller than an integral portion of an isolated mount and the glove may surround the motor, the gear assembly, or both so that the motor, the gear assembly, or both are snugly fit within the integral portion of the isolated mount. All or a portion of the isolated mount may be made of an elastomeric material such as a ethylene propylene diene monomer (EPDM), thermoplastic polyurethane, elastomer modified polyolefin, polysiloxanes, santoprene, 2 part urethane, polyvinyl chloride (PVC), or the like, or a combination thereof. Preferably, the isolated mount is made of a flexible polyvinyl chloride. In one non-limiting example, the motor, the gear assembly, or both may be sandwiched in a soft flexible elastomeric glove comprised of one or more pieces and then the complete glove with the motor, the gear assembly, or both may be placed in an integral housing formed in the compartment and covered forming an isolated mount.

One surface of the support base may be located substantially in one horizontal plane (i.e., the support base plane). The horizontal plane may be substantially perpendicular and/or perpendicular to a vertical plane. The support base may include one or more vertical planes (i.e., vertical support base plane). The horizontal plane of the support base may be substantially parallel to the surface on which the support base rests. The support base plane may be the same plane that a waste drawer slides along, substantially parallel to the plane that the waste drawer slides along, or both. The support base may include a waste drawer track so that the waste drawer is installed properly in the support base.

The support base includes a waste drawer. The waste drawer may be of any size and shape so that the waste drawer fits entirely within the support base. The waste drawer may be of a size so that all or a portion of the waste drawer fits within the support base. The waste drawer may slide within a plane. The waste drawer may slide within a plane of the support base. The waste drawer may form all or a portion of a forward surface of the support base. The waste drawer may include a volume. The volume of the waste drawer may be large enough so that the waste drawer can go 1 day or more, 3 days or more, 5 days or more, 7 days or more, or even 10 days or more before the waste drawer needs to be emptied. The waste drawer may have a volume of about 10,000 cm³ or more, preferably about 15,000 cm³ or more, or more preferably about 17,000 cm³ or more. The waste drawer may have a volume of about 30,000 cm³ or less, about 25,000 cm³ or less, or about 22,000 cm³ or less. The waste drawer may include a volume of between about 12,000 cm³ and about 30,000 cm³, preferably between about 14,000 cm³ and about 25,000 cm³, and more preferably between about 16,000 cm³ and about 20,000 cm³. The waste drawer may include one or more carbon filters for filtering the air in the waste drawer, entering the waste drawer, exiting the waste drawer, or a combination thereof. The carbon filter may be located at any location within the waste drawer. The carbon filter may be located proximate to a forward portion of the waste drawer. The waste drawer, the support base, or both may include a foot, a weight sensor, or both.

The foot may be part of the weight sensor. The foot may be attached to the support base by a fastener. The fastener may be part of the weight sensor. Preferably the fastener is a bolt and nut allowing adjustment. All or a portion of the weight sensor may be located between the head of the bolt and a nut. The fastener may extend through the center of the foot and through the bottom of the support base. A pre-compressed member may be located between the foot and the support base at a fixed length determined by the bolt and nut fastener. A pre-compressed member may be located between the foot and the support base such that the support base is supported by the pre-compressed member. A minimum gap dimension between the foot and the support base ensures that the support base is supported solely by the pre-compressed member. A maximum gap dimension between the foot and the support base ensures that displacement of the pre-compressed member is minimized when the pre-compressive force is overcome by the gross weight of the unit, for example when a cat enters the chamber. The weight sensor may be free of a gap. For example, the foot, the support base, or an adjacent component may have a flexible portion allowing for movement of a portion of the weight sensor when weight is added or subtracted. The overlap of the minimum and maximum gap dimensional requirements allows for the dimensional design range of the gap. The gap dimension is preferably from about 1.0 mm to about 2.0 mm.

A rocker arm may be located between the nut or retaining feature of the fastener and the support base. The rocker arm may be positioned and suspended above the support base by a pivot edge on one end and a contact surface on the other end of the rocker arm. The rocker arm contact surface may be enhanced by a compressible contact member which is attached to the contact surface. The rocker arm is attached and pulled down toward the support base by the force of the pre-compressed member imparted through the nut or retaining feature of the fastener. A force sensitive resistor or any other force monitoring device may be placed between the rocker arm contact surface and the support base. This arrangement of a force sensitive resistor or other force monitoring device between the rocker arm and the support base allow for an indirect measurement of weight. This arrangement of indirect force measurement allows for the use of more sensitive force sensors because only the force of the pre-compressed member which is imparted on the nut or retaining feature of the fastener and then onto the rocker arm contact surface is being measured. For example, as weight is added to the chamber, the support base imparts a greater downward force on the pre-compressed member, and as the force is increased to the point of equaling the pre-compression force of the pre-compressed member, the force imparted on the nut or retaining feature of the fastener and then onto the rocker arm contact surface is substantially zero. The pre-compression force may be any force so that a change in weight, an animal, or both may be measured. The pre-compression force may be about 0.5 Kg or more, about 1 Kg or more, about 2 Kg or more, or about 3 Kg or more. Therefore, the total range of force which can be measured is zero to the pre-compression force of the pre-compressed member with no offsetting force from the support base, such as can occur if the support base and consequently the foot are lifted off the surface upon which they rest. However, it is conceivable and possible to use an arrangement where the force sensitive resistor or other force monitoring device is placed between the foot and the floor, between the foot and the pre-compressed member, or between the pre-compressed member and the bottom of the support base which would measure the absolute weight of the unit less the mentioned components' weight below the force sensor.

The one or more compressible contact members may be any member that when a force is applied transfers the force to another member (e.g., a force sensitive monitoring device). The one or more compressible contact members may be located at any location along a rocker arm so that the one or more compressible members assist in transferring a force from the rocker arm. Preferably, the one or more compressible members are located in an end region of a rocker arm. The one or more compressible members may be made of any compressible material that has sufficient compressibility that the rocker arm, the force sensitive monitoring device, or both are not damaged during an application of force. The one or more compressible contact members may be made of any compressible material that has sufficient rigidity so that the compressible contact member transfers the force from the rocker arm to the force sensitive monitoring device. Preferably, the weight sensor indirectly measures weight (i.e., an indirect weight sensor).

The weight sensor may continually, intermittently, or both monitor the mass of the device. The weight sensor may be located at any location in the device so that any change is mass of the device is measured. The weight sensor may prevent rotation of the chamber when additional mass above a predetermined mass is located within the chamber. The predetermined mass may be any mass that prevents rotation, triggers rotation, or both. Preferably, the predetermined mass is less than the mass of any animal but more than the mass of waste retained within the chamber after the animal exits. The predetermined mass may be about 1 Kg or less, preferably about 0.5 Kg or less, more preferably about 0.25 Kg or less. The weight sensor may be located in any location capable of monitoring the mass of the chamber including the support base, under the waste drawer, in a leg of the device, or a combination thereof. The weight sensor may be located at any location in and/or on the device so that the mass of the device is measured without the weight sensor being directly contacted. For example, the weight sensor does not need to be directly compressed by a mass to detect a change in mass. The weight sensor may be any type of sensor that is capable of monitoring the mass or changes in mass discussed herein. The weight sensor may include one or more resistors, one or more members, one or more force sensors, one or more arms, one or more switches, one or more controllers, one or more microprocessors, or a combination thereof.

The expandable and/or compressible member (i.e. expandable member) may be any member that may be compressed. The expandable member may be any member that may expand when a force is removed. The expandable member may be pre-compressed before the member is placed into the device. For example, weight added to the unit will reduce the weight or force applied to the force sensitive monitoring device by a rocker arm, and conversely weight removed from the unit will increase the weight or force applied to the force sensitive monitoring device by a rocker arm. The expandable member may be compressed to a fixed dimension between a support base and a supporting foot, and a force sensitive measuring device placed between the rocker arm and the support base so that when a force applied to the rocker arm changes the reactive force applied to the force sensitive monitoring device, the resistance value of the force sensitive monitoring device changes allowing detection of a weight change. The expandable member may be a spring, an elastomeric plug, bushing, or a combination thereof. The weight sensor may further include a force sensitive monitoring device placed between the pre-compressed member and the support base, a portion of a leg, a rocker arm, a compressible contact member, or a combination thereof that monitors a force applied by the member.

The force sensitive monitoring device may be any device that may measure a force. The force sensitive monitoring device may be any device that measures a change in force from the rocker arm, the pre-compressed member on the rocker arm, or both. The weight sensor may detect virtually any change in mass of the device. The weight sensor may detect a change in mass of the device of about 2 Kg or less, about 1 Kg, or less, about 0.5 Kg or less, or about 0.25 Kg or less. The weight sensor may detect a change in mass of about 0.1 Kg or more, preferably between about 0.25 Kg and about 20 Kg, and more preferably between about 0.5 Kg and about 15 Kg. The force sensitive monitoring device may be a resistor (i.e., a force sensitive resistor). The force sensitive monitoring device may be any device capable of sending an electronic signal to a circuit board. The force sensitive monitoring device may relay the measurement to a controller, a microprocessor, or both. The indirect weight detection sensor may include a method of triggering a cleaning cycle.

The method may include one or more of the following steps and the order of the steps may vary depending upon the components used and the configuration of the components. The method of triggering a cleaning cycle may include one or more algorithms (i.e., sensor algorithm) described herein so that the device may be cleaned when the device has been used by an animal. The method may include a step of creating an initial baseline measurement. The step of creating an initial baseline measurement may include a step of creating a plurality of initial baseline measurements. The plurality of initial baseline measurements may be about 3 or more, about 5 or more, about 7 or more, or about 10 or more measurements to determine a baseline mass. The plurality of initial baseline measurements may be taken at any time during operation of the device. Preferably, the plurality of initial baseline measurements may be taken substantially immediately after the device is turned on, the reset button is pressed, a cleaning cycle is finished, litter is refilled, an empty cycle is performed, or a combination thereof. After the plurality of initial baseline measurements are taken the weight sensor may intermittently monitor, continuously monitor, or both the mass of the device.

The weight sensor may intermittently monitor or continuously monitor the mass of the device at any frequency so that the weight sensor detects the presence and subsequent exit of an animal from the device so that a cleaning cycle may be triggered. The plurality of initial baseline measurement may be updated by each new measurement taken, forming a rolling baseline measurement. For example, once the baseline measurement is established the most recent measurement taken may replace the oldest measurement so that the initial baseline measurement may be transformed into a new baseline measurement. Preferably, the weight sensor intermittently monitors the mass of the device until a change in mass is detected. Once a change is mass is detected, the weight sensor may continuously monitor the mass of the device until a predetermined number of substantially equal measurements are obtained, until a predetermined number of measurements are obtained that are substantially equal to a baseline measurement, until the mass of the device is reduced due to the exit of an animal, until a new baseline mass is determined, or a combination thereof and then the weight sensor may intermittently monitor the mass of the device. The number of predetermined measurements for continuous monitoring and intermittent monitoring may be substantially equal, different, or some variation there between.

The number of predetermined measurements may be between about 5 measurements and 100 measurements, preferably between about 10 measurements and 50 measurements, and more preferably about 15 measurements and 25 measurements. The weight sensor while intermittently monitoring may sense the mass between about every second and every minute, preferably between about every 5 seconds and every 30 seconds, or more preferably between about every 10 seconds and every 20 seconds. The weight sensor once a change in mass is sensed may continuously monitor the mass of the device. The weight sensor while continuously monitoring may monitor the mass of the device about 1 time a second or more, about 2 times per second or more, about 5 times a second or more, or about 10 times a second or more. The weight sensor while continuously monitoring may monitor the mass of the device between about 5 times a second and about 1 time every 10 seconds, preferably between about 3 times a second and about 1 time every 5 seconds, and more preferably between about 2 times a second and about 1 time every 2 seconds. The device once a change in mass has been detected may continuously monitor until the change in mass is substantially reduced back to the baseline mass, until a predetermined number of equal measurements are taken, or both. After the weight sensor has measured that the mass of the device has been reduced to substantially the baseline mass the controller, the microprocessor, or both may trigger a cleaning cycle after a predetermined amount of time. The predetermined amount of time may vary based upon the baseline measurement. The predetermined amount of time may be fixed. The predetermined amount of time may be about 1 minute or more, about 3 minutes or more, about 5 minutes or more, or about 7 minutes or more after the weight sensor measures that the mass of the device has substantially returned to the baseline mass. The predetermined amount of time may be about 30 minutes or less, about 20 minutes or less, or about 10 minutes or less after the weight sensor measures that the mass of the device has substantially returned to the baseline mass. The predetermined amount of time may be between about 2 minutes and 30 minutes, about 4 minutes and 20 minutes, or preferably between about 6 minutes and 10 minutes after the weight sensor measures that the mass of the device has substantially returned to the baseline mass. For example, the weight sensor may intermittently monitor the mass of the device every 15 seconds when a change in mass has not been detected in the device for the past 20 measurements, once a change in mass has been detected the weight sensor may measure the mass every second until 20 consecutive measurements substantially equal to the baseline measurement are taken; and then the weight sensor will trigger a cleaning cycle about 7 minutes after the change in mass has changed back to substantially the same as the baseline measurement. The weight sensor may prevent the triggering of a cleaning cycle when the weight sensor detects an animal in the chamber, when the mass in the chamber is substantially higher than the baseline mass (e.g., about 1 Kg or more or about 2 Kg or more). Once a cleaning cycle has been triggered the waste may be transported into a waste drawer.

A cleaning cycle may include one or more of the following steps. The chamber may be rotated clockwise or counter-clockwise depending on the positioning of the screen and septum. The chamber during a cleaning cycle, an empty cycle, or both may be rotated about 180 degrees or more, preferably about 205 degrees or more, about 245 degrees or more, about 300 degrees or more, or about 360 degrees or more. For example, the chamber may rotate 275 degrees in one direction and then 50 degrees in a second direction to level the litter. In another example, the chamber may rotate over 220 degrees to ensure that all of the litter is emptied out of the chamber. During the initial moments of rotation the shield may remain static so that the contact region is exposed and the waste may travel along the contact region. Once the chamber has moved a predetermined distance that shield may rotate with the chamber so that the liner may drop. As the chamber rotates the litter may ride up the wall of the chamber and as the litter achieves the angle of repose the litter may move towards and into contact with the screen. The screen due to gravity may move into contact with the chamber, the litter may push the screen into contact with the chamber, or both so that all or a majority of the litter is passed through the screen and any waste is removed from the litter. The "clean" litter may pass into the septum where it is stored. The waste may travel along a contact region of the screen and the septum towards the waste opening. The waste may pass through the waste opening and into the waste drawer where the waste level is monitored by the indicator as discussed herein.

The support base or waste drawer may include one or more indicators for monitoring the amount of contents. The indicator may indicate when the waste drawer is full (i.e., needs to be emptied). The indicator may be used to monitor important variables that may impact use of the waste drawer. Examples of variables that may be monitored include a presence of an animal part in a drawer, weight of the drawer contents, location of the drawer, distribution of the contents in the drawer, or a combination thereof. The indicator may prevent the chamber from being rotated when the waste drawer is full, when an object is detected by the indicator, or both. For example, if an animal's paw, tail, or both extend through a hole and/or port in the chamber into the waste drawer and the paw, tail, or both are detected by the indicator the indicator will prevent the chamber from being rotated so that the animal's paw, tail, or both are not pinched. The indicator may include a tight indicating that the waste drawer is full. The indicator may include a gauge indicating the level in the waste drawer. The indicator may be any type of sensor that detects the presence of an object, the level of objects in the waste drawer, or both. The indicator may have any type of sensor, receiver, or both so that objects are detected, the level of objects are detected, or both. The indicator may be a mass sensor, a capacitive sensor, an infrared sensor, ultrasonic sensor, a membrane sensor, radio frequency (RF) admittance sensor, conductive sensor, optical interface sensor, microwave sensor, or a combination thereof. Preferably, the sensor is an infrared sensor that includes one or more emitters and one or more receivers for measuring the level of waste in the waste drawer. The indicator may scan the waste drawer to determine the level of waste in the waste drawer. Preferably, the indicator monitors multiple locations to determine the amount of waste in the waste drawer. More preferably, the indicator includes an emitter in each quadrant of the waste drawer spaced directly opposite a receiver so that the level of waste in the waste drawer in each quadrant is monitored. For example, the emitters and receivers may be located adjacent and/or on a top edge of a waste drawer, on a support base, or both on opposing sides so that when a level of contents of the waste drawer reach substantially the top of the waste drawer the indicator indicates that the drawer is full.

The indicator may include and/or be in communication with one or more circuit boards, one or more transmitters, one or more controllers, one or more emitters, one or more receivers, or a combination thereof so that the level of waste may be transmitted so that a gauge indicates the level, the chamber may be prevented from rotating, a full light may be triggered, an agitator may be triggered to level the waste, or a combination thereof. The waste drawer may include an agitator that shifts the drawer (e.g., back and forth, side to side, or a movement therebetween) so that the waste may be evenly distributed between the quadrants. The agitator may agitate the drawer if an indicator in a quadrant indicates that it is full or empty relative to the other quadrants so that the waste is evenly distributed. The indicator may continuously monitor the level of waste in the waste drawer. The indicator may monitor the level of contents after a cleaning cycle. The indicator may monitor the level of waste in the waste drawer once an hour. Preferably, the indicator monitors the waste level after each clean cycle. The waste drawer may include a distribution feature so that waste is evenly distributed throughout the waste drawer.

The distribution feature may be any device that evenly distributes waste throughout the waste drawer. The distribution feature may be located at any location within the waste drawer so that waste is evenly distributed. Preferably, the distribution feature may be located substantially directly below the chamber. More preferably, the distribution feature may be located directly below a waste opening in the chamber so that as waste enters the waste drawer the distribution feature assists in evenly distributing the waste throughout the waste drawer. The distribution feature may be a projection in the floor that vertically extends all or a portion of the waste drawer up so that as waste enters the waste drawer the waste moves down the projection into a region with less waste. The waste drawer may be free of a distribution feature. The waste drawer track, a recess in the waste drawer to accommodate the weight sensor, or both discussed herein may be the distribution feature. The waste may be moved into the waste drawer in such a manner that the waste is evenly distributed throughout the drawer without the use of any additional features. The waste may form a mound in the waste drawer and then as the waste accumulates an angle of the waste may become too steep so that waste is evenly distributed. For example, the waste may be distributed by an angle of repose. The waste drawer is located below a chamber so that during a cleaning cycle waste may be transferred from the chamber to the waste drawer.

The waste drawer may further include a step, a cleaning device, or both proximate to an opening in the chamber. The step may be any part and/or device in a region adjacent an opening of the chamber that an animal may use to enter and exit the chamber. The step may be integrally formed in the waste drawer so that the step also acts as a handle to remove the waste drawer from the support base. The step may be part of the support base and may not be movable. The step may have a fixed position (i.e., the step does not deflect when the animal steps on the step). The step may include one or more cleaning devices so that litter may be removed from the animal's paws when the animal exits the chamber. The one or more cleaning devices may be a mat, a pad, a screen, or a combination thereof. The one or more cleaning devices may be any size, shape, pattern, configuration, or a combination thereof so that the cleaning device assists in removing litter and/or any other unwanted remnants from the animals paws so that the litter and/or unwanted remnants are not tracked throughout the region surrounding the automated cleaning device. Preferably, the cleaning device may include one or more flexible ribs that flex and catch litter and/or other unwanted remnant from the animals paws as the animal exits the chamber. The cleaning device may be made of any material so that as an animal exits the chamber the cleaning device assists in removing litter and/or unwanted remnants from the animals paws. The cleaning device may be made of rubber, plastic, a polymer, a natural material, a synthetic material, or a combination thereof. The cleaning device may be fixed, removable, or both in the step of the waste drawer. The waste drawer may include one or more recesses so that a user may lift the cleaning device from the step of the waste drawer. The cleaning device may include one or more lift tabs so that the cleaning device may be removed from the step of the waste drawer. The step of the waste drawer, the cleaning device, or both may include one or more features such as locking tabs, so that the cleaning device may be secured to the step of the waste drawer.

The chamber may be any device where an animal may enter and excrete waste. The chamber may be any device that holds litter. The chamber may be any size and shape so that an animal may fit within the chamber. The chamber may be large enough to fit an animal of about 4 Kg or more, about 6 Kg or more, about 8 Kg, or more, or about 10 Kg or more within the chamber. Preferably, the chamber is large enough so that an animal of up to about 15 Kg may fit within the chamber. The chamber may be shaped like a globe, a sphere, a football, an egg, or a combination thereof. The chamber has a volume that is large enough so that an animal of any size discussed herein may fit within the chamber. The volume of the chamber may be about 16,000 $cm^3$ or more, about 32.500 $cm^3$ or more, or about 65,000 $cm^3$ or more. The volume of the chamber may be about 100,000 $cm^3$ or less, about 85,000 $cm^3$ or less, or about 75,000 $cm^3$ or less. The volume of the chamber may be between about 12,000 $cm^3$ and about 100,000 $cm^3$, preferably between about 15,000 $cm^3$ and about 75,000 $cm^3$, or more preferably between about 20,000 $cm^3$ and about 50,000 $cm^3$. The chamber may have a volume that is usable by an animal that may fit through the entry opening. The usable volume may be any volume so that the chamber may be used by the animal to excrete waste. Preferably, the usable volume may be any volume so that the animal may turn around and move with the chamber. The usable volume may be the volume of the chamber minus the volume occupied by the litter and minus any internal components. The usable volume of the chamber may be increased by adjusting the axis of rotation of the chamber, adjusting the angle of the entry opening in the chamber, or both.

The chamber has an axis of rotation. The axis of rotation of the chamber may have any orientation so that the usable volume is increased, the litter relative to the chamber has a conical rotation, the waste is funneled towards the rear of the chamber (i.e., away from the front opening), a screen and/or septum are located further back in the chamber creating more internal space, a larger entry opening may be used, or a combination thereof. The axis of rotation of the chamber may form an angle with a vertical plane. Preferably, the vertical plane is in the direction of gravity, is parallel to gravity, or both. The axis of rotation of the chamber may form any angle with a vertical plane so that one or more of the teachings herein are achieved. The axis of rotation may form an angle of about 85 degrees or less, about 80 degrees or less, preferably about 75 degrees or less, or more preferably about 70 degrees or less with a vertical plane. The axis of rotation may form an angle of about 45 degrees or more, about 60 degrees or more, or about 65 degrees or more with vertical but less than about 90 degrees. The axis of rotation may form an angle of between about 85 degrees and about 45 degrees, about 80 degrees and 55 degrees, or preferably between about 75 degrees and 66 degrees (i.e., about 70 degrees) with a vertical plane. The angled axis of rotation may funnel clumps, waste, or both towards a central rear location during rotation of the chamber. The angled axis may funnel clumps, waste, or both to a location so that a single waste port may be employed to transport waste from the chamber into the waste drawer. The angled axis of rotation may result in a litter bed with an angle of repose. The angle of the litter bed may be any angle so that the litter is angled away from a front opening (i.e., the depth of the litter will be less proximate to the front opening and the depth of the litter will gradually increase as the litter becomes more distal from the front opening). The angle of the litter bed may be any angle so that the litter bed is retained within the chamber. The angle of the litter bed may be any angle so that the chance of an animal accidentally moving litter out of the opening is reduced when compared to a litter bed that is free of an angle (i.e., about 90 degrees from a vertical plane). The angle of the litter bed may form an angle that is about 89 degrees or less, about 88 degrees or less, about 87 degrees or less, or about 85 degrees or less from a vertical plane. The angled axis of rotation may allow for a larger entry opening to be used in the chamber without litter being removed from the chamber, litter being spilled from the chamber, litter spilling out during rotation of the chamber, or a combination thereof. The litter bed may rest on any surface of the chamber.

The chamber may directly contact the litter while the chamber is in the home position. Preferably, the chamber includes a liner that covers the chamber and the liner directly contacts the chamber. The liner may be any device that contacts the litter and retains the litter, waste, liquids, solids, semi-solids, or a combination thereof in the chamber so that the litter may absorb, encircle, clump, or a combination thereof the contents and remove the contents during a cleaning cycle. All or a portion of the liner may be attached to the chamber. Preferably, at least a portion of the liner is free of attachment to the chamber so that during a cleaning cycle the liner may drop and loosen and/or remove any contents that were stuck to the liner. The edges of the liner may be connected to the chamber and the central region of the liner may be free of attachment to the chamber so that during a cleaning cycle the liner may fall. The liner may be a nonstick surface. The liner may be liquid impenetrable. The liner may be made of any material that may hold animal waste, litter, liquids, solids, semi-solids, or a combination thereof without being damaged, stained, permanently affixed to, penetrated, or a combination thereof. The liner may be rubber, plastic, a synthetic material, a natural material, or a combination thereof. Additional aspects regarding the liner may be gleaned from the teachings herein including those of Column 2, lines 6-61 and Column 4, line 66 to Column 5, line 59 of U.S. Pat. No. 6,463,881, issued on Oct. 15, 2002, incorporated by reference herein, which shows liner and the liner function during a cleaning cycle.

The chamber may have one entry opening that animals may use to enter and exit the chamber. The entry opening may be any size and shape so that animals may enter and exit the chamber. The entry opening may be any size and shape so that during use, a cleaning cycle, entry, exit, or a time there between litter is substantially maintained with the chamber. The entry opening may form a plane. The entry opening plane may extend along the entry opening (e.g., along a surface that extends from the top of the entry opening to the bottom of the entry opening). The entry opening, the entry opening plane, or both may form an angle with vertical. The entry opening, the entry opening plane, or both may form an angle with vertical of about 10 degrees or more, about 15 degrees or more, or about 20 degrees or more. The entry opening, the entry opening plane, or both may form an angle with vertical of about 60 degrees or less, preferably about 45 degrees or less, or more preferably about 25 degrees or less, but greater than zero degrees. The entry opening, the entry opening plane, or both may form an angle with vertical of between about 5 degrees and 45 degrees, between about 10 degrees and 35 degrees, or between about 15 degrees and 25 degrees (i.e., about 20 degrees). The entry opening may be circular, square, elliptical, symmetrical, non-symmetrical, or a combination thereof. Preferably, the entry opening may be oval. More preferably, a primary axis of the opening extends substantially in the direction of the vertical plane. For example, the primary axis of the opening will be generally vertical when compared to a secondary axis. The secondary axis of the opening may be generally perpendicular to the vertical axis. The length of the primary axis and the length of the secondary axis may form a ratio. The ratio of the length of the primary axis to the length of the secondary axis may be any ratio so that an animal may fit within the opening and the contents of the chamber may be maintained with the chamber during use, cleaning, exit, entry, or any time therebetween. The ratio of the length of the primary axis to the length of the secondary axis may be about 1.2:1 or more, about 1.4:1 or more, about 1.5:1 or more, or about 1.6:1 or more. The ratio of the length of the primary axis to the length of the secondary axis may be about 3:1 or less, about 2.5:1 or less, or about 2:1 or less. The axis of rotation may run juxtaposed to the primary axis, the secondary axis, or both. The axis of rotation may pass through the primary axis, the secondary axis, or both at any location along their length. Preferably, the axis of rotation runs substantially through the center of the primary axis, the secondary axis, or both. The entry opening may have an area.

The area of the entry opening may be any area so that an animal of the teachings herein may fit through the opening into the chamber. The area of the entry opening may be about 75 cm$^2$ or more, about 125 cm$^2$ or more, about 175 cm$^2$ or more, about 225 cm$^2$ or more, or even about 250 cm$^2$ or more. The length of the opening in the primary axis of about 15 cm or more, about 20 cm or more, or about 25 cm or more. The length of the entry opening in the secondary axis may be about 8 cm or more, about 10 cm or more, about 12 cm or more, or about 15 cm or more. The entry opening may include an entry lip.

The entry lip may be in any form that creates a lip on the entry opening so that any contents of the chamber are prevented from sliding out of the chamber, being pushed out of the chamber and/or kicked out of the chamber, or both. The entry lip may be integrated in any form into the chamber that prevents liquids from coming out of the entry opening, assists is transporting liquids into the chamber, or both. The entry lip may be positioned so that an animal fully enters and/or fully exits the chamber. The entry lip may cover and connect to a bottom portion of the entry opening. The entry lip may include a fence feature, a lip, a drain, or a combination thereof. The entry lip may include a lip that extends out of the chamber so that anything that may fall as an animal is exiting the chamber, entering the chamber or both may be caught on the lip and funneled towards and/or into the chamber. The entry lip may funnel liquids, solids, or both to a drain. The drain may allow for solids, liquids, or both to funnel into the chamber. The drain may extend through and/or around a fence in the entry lip. The fence may be any device that extends vertically from the base of the entry opening so that a barrier is created. The fence may extend up high enough so that the top of the fence touches the underside of an animal so that the animal fully enters, fully exits, or both the chamber. The fence may have any height so that the animal may exit and enter the chamber over the fence and assist in retaining litter within the chamber. The fence may have a height of about 1 cm or more, about 2 cm or more, or about 2.5 cm or more. The fence may have a height of about 5 cm or less, about 4 cm or less, or about 3 cm or less. The fence may be rigid, flexible, deformable, or a combination thereof. The fence may be positioned substantially in the vertical plane. The fence may form an angle. The fence may form an angle so that the fence extends along a plane with the major axis of the entry opening. The fence may form substantially the same angle with the vertical plane as the entry opening, the entry opening plane, or both. The angle, shape, or both of the entry lip may funnel liquids, solids, litter, or a combination thereof into the chamber during a cleaning cycle so that any liquids, solids, litter, or a combination thereof that are dropped during an animal entering and/or exiting the chamber are retained within the chamber and may be removed from the chamber during a cleaning cycle through a waste opening.

The chamber includes a waste opening. The waste opening may be at any location in the chamber so that waste may be removed from the chamber and moved into the waste drawer. The waste opening may be at any location in the chamber so that when the chamber is in the home position the waste opening allows for light to enter the chamber. The waste opening may be on an opposing wall of the chamber as the entry opening. For example, the chamber may include a track around the circumference of the chamber and the entry opening may be on one side of the track and the waste opening may be on an opposing side of the track. The waste opening may be located entirely in one quadrant of the chamber. For example, when the chamber is viewed from the top the chamber may form four quadrants, the track plane may form one axis and the axis of rotation may form the second axis of the chamber, and the waste opening may be located entirely within one quadrant. The waste opening, during a cleaning cycle, may substantially align with a main region of the waste drawer. The waste opening, during a cleaning cycle may be rotated by an angle of about 135 degrees or more, about 150 degrees or more, about 180 degrees or more, or a complete revolution, or about 205 degrees or more so that litter may be cleaned and stored by a screen and septum and waste may be removed from the chamber through the waste opening.

The screen and septum may be in any form that removes the waste from the litter and stores the litter so that only the waste is removed from the chamber during a cleaning cycle. Preferably, the screen and septum may be one unitary piece. The screen and septum may be separate pieces. The screen and septum may be integrated into the chamber. More preferably, the screen and septum may be attached together via a living hinge. The living hinge may be any part of the screen and/or septum that may move during a cleaning cycle as taught herein. The living hinge may be any part of the screen and/or septum that allows the screen to move as the chamber rotates. The living hinge may be any device that allows the screen to move so that the screen cleans litter during the beginning of a cleaning cycle and the screen moves above and/or on top of the litter when the chamber returns to the home position. The living hinge may be made of any material so that the screen opens and closes during a cleaning cycle. The living hinge may be plastically deformable. Preferably, the living hinge may be elastically deformable so that the living hinge closes the screen during a first half of cleaning (i.e., rotating towards removing the waste) and the hinge opens the screen during the second half of cleaning (i.e., rotating back towards the home position). The living hinge may be made of a polymeric material, a rubber material, a synthetic material, a natural material, or a combination thereof. Preferably, the living hinge is made of the same material as the screen and the septum. The living hinge may be created during formation of the screen and the septum. The living hinge may be an area of thinner material so that the thinner material exhibits some flexibility. The living hinge may be a crease created between the screen and septum so that the screen moves during a cleaning cycle. Preferably, the screen moves into a cleaning position during the beginning of cleaning cycle so that the screen removes waste from the litter while allowing "clean" litter to pass into the septum. For example, during the beginning of a cleaning cycle the chamber may rotate counterclockwise so that the litter presses the screen down towards an inner wall of the chamber so that the screen removes any particles larger than the screen size from the litter. Preferably, the living hinge moves to a return position during the end of a cleaning cycle so that "clean" litter passes under the screen back into the base of the chamber so that the "clean" litter may be used. For example, once the chamber has rotated and the waste is removed from the chamber through the waste opening the chamber begins to rotate, clockwise, back towards the home position, and the screen will move away from the internal wall of the chamber so that the litter will move under the screen into the base of the chamber. The living hinge may open as the living hinge travels to a home position after the chamber has removed waste so that the litter passes under the screen and dust is minimized and/or eliminated. The end of the screen may be fixedly connected to an internal chamber wall. Preferably, the end of the screen may contact an internal wall during at least a portion of a cleaning cycle, but may move away from the internal wall during rotation of the chamber to a home position. The septum may have a single opening where the litter enters and exit the septum. The septum may have an entry opening and an exit opening. The exit opening may be hinged, include a spring loaded door, or both. Preferably, the exit opening of the septum is hinged, includes a spring loaded door, or both that allows the litter to pass all of the way through the septum and flow directly back into the bottom of the lined chamber, be temporarily closed and retain the litter, or both. The spring loaded door may closed during rotation and be opened by the weight of the litter so that the litter is returned to the chamber after the waste is removed from the chamber. Additional aspects regarding a screen and septum may be gleaned from the teachings herein including those of column 12, line 12 through column 13, line 12 and FIGS. 3-8 and 13 of U.S. Pat. No. 5,662,066, issued on Sep. 2, 1997, incorporated by reference herein, which shows a cleaning cycle using a screen and septum. During a cleaning cycle one or more internal components, one or more internal surfaces, or both of the chamber may contact litter, waste, or both.

The one or more internal components, one or more internal surfaces, or both when contacted by litter, waste, or both may retain residual amounts of litter, waste, or both. These residuals may be transferred to an animal when the animal enters the chamber. For example, during a cleaning cycle litter dust may form on a region of the chamber proximate to the waste opening and if an animal while inside the chamber contacts this surface the litter dust may transfer to the animal's fur and/or hair. The chamber may include a shield assembly which covers one or more internal components, one or more internal surfaces, or both so that any residuals that may be present on the components, surfaces, or both are covered by a clean surface so that residuals are not transferred to the animal.

The shield assembly may be in any form that covers an internal surface, internal component, or both that directly contacts litter, waste, or both so that any residual matter on those surfaces is covered by the shield assembly and is not transferred to an animal. The shield assembly may be in any form which is located between a surface with residual matter and an animal so that residual matter is not transferred to the animal. The shield assembly may be static. Preferably, at least a portion of the shield assembly is rotatable (i.e., an internal rotatable shield). The shield assembly may rotatably attach to the chamber.

The shield assembly may include a shield, a retainer, a biasing member (e.g. a torsion spring), a screw, a washer, and a holder. The shield assembly may be assembled about the rotational axis of the chamber. The retainer may be rotatably attached to the holder and a biasing member may be attached about the rotational axis of the retainer. The biasing member may be fixedly attached to the retainer and correspondingly attached to a stop feature (e.g., a tab) in the holder. The biasing member may be attached to and located between the retainer and holder such that a torsion force is applied to the retainer by the biasing member. The retainer is prevented from rotating in reaction to the torsional force by a hook on the retainer that comes into contact with a tab in the holder thus preloading the biasing member (i.e., torsion spring), and retainer. The shield may be keyed so that the shield attaches to the retainer with a screw and washer such that the shield and retainer always rotate together. The holder may also be held in a position axially by the screw and washer. A clearance between the washer and the holder may allow free rotational movement of the retainer within the holder. The shield resides on the inside of the chamber and the retainer and holder reside on the outside of the chamber. The holder is prevented from rotating by nesting in a slot of the support base. The shield may rotate clockwise, counterclockwise, or both. For example, one possible rotation sequence of the shield assembly is as follows. Starting from the home position, as the chamber begins to cycle in a counter clockwise direction, the shield does not rotate because the shield is keyed to the retainer which is held in position by the biasing member forcing the retainer hook against the tab in the holder which is always stationary. The shield remains stationary until the chamber tab rotates into position and comes into contact with a tab on the retainer which causes the retainer and shield to rotate along with the chamber. When the retainer and shield rotate with the chamber, the biasing member is further loaded (e.g., wound) increasing the torsion force between the retainer and holder until the chamber stops at the cleaning position. When the chamber returns to the home position in a clockwise direction the retainer is held against the chamber tab by the torsion force of the biasing member until the retainer hook reaches the tab within the holder again at which time the retainer (and thus shield) stop and the chamber continues to rotate in a clockwise direction to level the litter.

The retainer may have one or more ears that contact the chamber, a holder, a biasing member, or a combination thereof. The one or more ears may be any member that assists in rotating the shield, maintaining the shield in a static position, or both. The holder, retainer, biasing member, shield attachment, shield, hole (ie bearing surface) in the chamber, or a combination thereof may substantially be aligned along the axis of rotation. The holder may be free of a fixed relationship with the chamber so that the chamber may rotate around the holder. The holder, the retainer, or both may include one or more tab features, retainer stops, biasing member stops, or a combination thereof. The tab features, retainer stop, biasing member stops, or a combination thereof may be a feature that contacts a part of the retainer, the biasing member, or both and prevents the retainer and/or biasing member from rotating, allows the retainer and/or biasing member to rotate, rotates the retainer and/or biasing member with the chamber, or a combination thereof. The holder may attach to the chamber at a location proximate to the retainer, contact a chamber tab, or both so that the holder at least partially rotates with the chamber. The holder may prevent the retainer, the biasing member, or both from rotating so that as the chamber rotates the shield moves independent of the chamber's rotation and/or remains static for at least a part of the chamber's rotation. The biasing member may be wound when installed. The biasing member may be wound so that when the chamber is in the home position the biasing member is exerting a force on the retainer, the holder, the shield, or a combination thereof.

The shield may include a home position and a rotating position. The home position may be any position where the shield covers an internal region of the chamber that may include residual matter. The home position may be proximate to the waste opening. The home position may cover all or a portion of the screen, the septum, or both. The home position may be any position where the shield is located when the chamber is not moving; where the tab feature, the retainer stop, or both is not moving the shield; the biasing member is not moving the shield; or a combination thereof. Preferably, the shield may be in the home position when the chamber is static and then as the chamber begins to rotate the shield remains static until the chamber is sufficiently rotated that the shield will not directly contact the litter, waste, or both. The shield may remain static until the regions of direct contact with waste, litter, or both; the waste opening; or both pass by the shield. The shield may remain static until the chamber rotates far enough that a tab on the chamber comes into contact with the retainer and overcomes the force of the spring and then the shield may rotate with the chamber. The shield may rotate from a home position to a rotate position. The rotate position may be any position where the shield is free of direct contact with litter, waste, or both where the shield clears the waste opening, the shield is clear so that the liner may drop, or both. The rotate position may be located on a side of the waste opening opposite the direction of rotation of the chamber during a cleaning cycle. The rotate position may rotate the shield to a location where the shield is free of direct contact with waste, litter, or both and the shield is in a location where the liner may fall without the shield interfering. The shield when in the rotate position may be substantially free of contact with a fully extended liner, be located on a side of the chamber, or both. After waste has been removed the shield may remain in the rotate position until the liner returns to the home position, the tab feature and/or retainer stop releases pressure on the spring, the chamber rotates far enough that the tab on the chamber disengages from the retainer and the force of the spring is sufficient to move the shield to the home position, or a combination thereof. During a cleaning cycle the chamber may be rotated by any device and/or mechanism.

The chamber may be rotated using any rotation device that assists in rotating the chamber. The rotation device may be a track, a gear, a high friction surface, a raised area, a toothed area, a contact surface area, or a combination thereof. The support base may include a rotation device that corresponds to any device, mechanism, track, or a combination thereof of the chamber so that a motor, a drive mechanism, or both in the support base may rotate the chamber. The rotation device may be a belt, a cog, a sprocket, a toothed assembly, rollers, a wheel, or a combination thereof. Preferably, the chamber includes a toothed track around an outside of the chamber and the support base includes a corresponding toothed device that rotates the chamber.

The track may encircle an outside wall of the chamber so that the chamber may be rotated around the axis of rotation. The track lies in a plane. The track plane may be any plane, have any angle, or both so that the chamber may rotate around the axis of rotation taught herein. The track plane may form an angle with the vertical plane (i.e., gravity). The track plane may form an angle of about 5 degrees or more, about 10 degrees or more, or about 15 degrees or more with the vertical plane. The track plane may form an angle of about 85 degrees or less, about 65 degrees, or less, or about 45 degrees or less with the vertical plane. The track plane may form an angle of between about 5 degrees and 60 degrees, between about 10 degrees and 40 degrees, or between about 15 degrees and 35 degrees with the vertical plane. The track may be used to rotate the chamber around the axis of rotation during a cleaning cycle, an empty cycle, or both. The track may be used to rotate the chamber clockwise, counter-clockwise, or both. The track, drive gear, a contact point with the chamber, or a combination thereof may be located within the support base so that a pinch point is not created. Preferably, the track is covered by a bonnet.

The bonnet may be any device that extends over the chamber. The bonnet may attach to the support base on one or both sides of the chamber. The bonnet may partially or fully cover the track in the home position, during a cleaning cycle, during an empty cycle, or at any time therein between. The bonnet may fully or partially cover the waste opening in the home position, during a cleaning cycle, during an empty cycle, or at any time therein between. Preferably, the bonnet covers both the track and the waste opening at all times so that a pinch condition is not created when the chamber rotates. The bonnet may remain static as the chamber rotates. The bonnet may connect on one or more sides to the support base. The bonnet may connect to the device using any method and/or apparatus that connects the bonnet to the device. Preferably, the bonnet is attached via any fastener (e.g., screw, bolt, formed sheet metal, interlocking tab, rivet, pin, the like, or a combination thereof) that connects the bonnet to one or both sides of the support base. More preferably, the bonnet is attached via any fastener that conducts electricity or current so that the bonnet may be powered and a sensor may sense when one or both sides of the bonnet have been removed from the support base. The bonnet may connect to the support base using one or more retaining clips located in the bonnet, the support base, or both. The bonnet, the support base, the retaining clips or a combination thereof may be and/or include an interlock sensor so that if one or both sides of bonnet are removed from contact, electrical contact, or both the chamber is prevented from rotating.

The interlock sensor may be any sensor that detects if one or both sides, one or more retaining clips, or both are partially removed, completely removed, or both so that rotation of the chamber is prevented. The interlock sensor may include a low current electrical sensor that is in communication with a motor, a controller, a microprocessor, or a combination thereof. The low current electrical sensor may transmit a signal to the motor, the controller, the microprocessor, or a combination thereof when the bonnet is removed so that the chamber does not rotate. The interlock sensor may sense power being supplied to the bonnet through the connection points. The bonnet may include one or more power connection points and power may be supplied to the bonnet when the bonnet is connected on one or more sides to the support base. The one or more power connection points may feed power from the support base to one or more lights, one or more ambient light sensors, or both.

The one or more lights, the one or more ambient light sensors or both may connect to the bonnet, the chamber, the support base, or a combination thereof. The one or more lights may supply light to the inside of the chamber. The one or more lights may indirectly supply light through a transparent panel in the chamber. Preferably, the one or more lights may directly supply light into the chamber through the waste opening when the waste opening is in the home position. More preferably, the bonnet includes at least three lights directed at different angles so that the inside of the chamber is illuminated. The lights may turn on when an ambient light sensor detects the light in the chamber has reduced below a predetermined lumen level. The lights may turn on when the indirect weight sensor senses a change in mass and the ambient light sensor detects the light in the chamber has reduced below a predetermined lumen level. All or a portion of the bonnet may be transparent. Preferably, the portion of the bonnet that aligns with the waste opening is transparent so that day light, natural light, light in the surrounding regions, or a combination thereof may pass through the bonnet into the chamber. The bonnet may include a transparent portion that aligns with the one or more ambient light sensors so that the ambient light sensors may monitor the amount of light surrounding the chamber. Preferably, the bonnet may cover the chamber so that light may enter the chamber through at least the waste opening while the bonnet prevents a pinch condition from being created between the support base and the track and/or the waste opening as the chamber rotates.

The automatic litter device may include one or more pinch detectors. The one or more pinch detectors may be located proximate to any pinch points that may exist so that the pinch detector is contacted before an edge of the chamber, the waste opening, the support base, the bonnet, the waste drawer, any other components of the automatic litter device, or a combination thereof and the rotation of the chamber is stopped. Preferably, one or more pinch detectors may be located in the support base proximate to the waste drawer so that as the chamber begins to rotate towards the home position the pinch detector will be contacted and the rotation of the chamber may be stopped before a pinch condition occurs. The pinch detector may prevent a pinch condition if an item is extending through the waste opening, but is not extending far enough into the waste drawer that the indicator for detecting the level of waste in the drawer would detect the item and prevent rotation of the chamber. The pinch detector may be any sensor that detects an item projecting through the waste opening that may be subject to a pinch condition. The pinch detector may be any sensor that detects an impending pinch condition. The pinch detector may be rigid, flexible, partially flexible, jointed, hinged, elastically deformable, or a combination thereof. During a possible pinch condition an item extending through the waste opening that is not detected by the indicator may contact and deflect the pinch detector stopping the chamber from rotating. The controller, the microprocessor, the motor, or a combination thereof may cause the chamber to reverse so that the waste opening may be cleared. The pinch detector may flex back to its pre-deflected state so that if another pinch condition is created the pinch detector may prevent the pinch condition. The pinch detector may have a resistance when the pinch detector is in the home position (i.e., the pinch detector is not deflected). The pinch detector may have a different resistance when the pinch detector is in a deflected state (i.e., preventing a pinch condition). The pinch detector may be a simple normally closed switch which is opened when the pinch detector is deflected. The pinch detector may be a simple normally open switch which is closed when the pinch detector is deflected. The pinch detector may be electrically connected to a controller, a microprocessor, or both that monitor the switch status or resistance of the pinch detector for a pinch condition so that the pinch condition is prevented. The microprocessor, the controller, or both may rotate the chamber towards the home position, the empty position, the cleaning position (i.e., waste removal position), the level position, or a combination thereof until one or more sensors indicate that the chamber has achieved the desired position.

The microprocessor, the controller, or both may monitor the relative position of the chamber using one or more sensors. The sensors may be any sensor that may detect the position of the chamber relative to the support base. The sensors may be Hall effect sensors. The automated litter device may include a safety stop if the Hall effect sensors, the microprocessor, the controller, or a combination thereof cease to sense the position of the chamber, temporarily lose a signal, break, or a combination thereof. The safety stop may include a chamber stop, a support base stop, or both. The chamber safety stop may be a protrusion that extends from a portion of the chamber and contacts a part of the support base so that rotation of the chamber is prevented. The support base safety stop may be a protrusion that extends from the support base and contacts a piece of the chamber so that the chamber is prevented from rotating. Preferably, the chamber safety stop extends out so that when the chamber safety stop contacts a corresponding surface in the support base, rotation of the chamber the chamber is physically prevented. When the safety stop prevents the chamber from moving, the controller, the microprocessor, the motor, or a combination thereof may immediately stop rotating the chamber, may time out and stop rotating the chamber after a predetermined amount of time, or some time therein between. The controller, microprocessor, the motor, or a combination thereof may cease rotating the chamber at any period of time so that the chamber, the support base, rotation device, or a combination thereof are not damaged. A predetermined wait time of about 15 seconds or less, about 10 seconds or less, about 5 seconds or less, or about 2 seconds or less may allow the cause of the interruption to clear. The safety stop may prevent the chamber from over rotating in one direction but may allow the chamber to rotate in an opposing direction without rotation being prevented. For example, the safety stop may prevent the chamber from rotating past the waste opening during a cleaning cycle, but the safety stop may be bypassed during an empty cycle so that all of the contents of the chamber may be removed. Preferably, the stop prevents over rotation beyond the cleaning position but allows rotation beyond the home position so that the litter may be emptied in the empty cycle. The support base, the chamber, or both may include a diverter so that the when the chamber rotates during an empty cycle the safety stop may be bypassed and all of the contents may be emptied out of the chamber. The diverter may be any device that diverts the safety stop from contacting the opposing corresponding part of the safety stop so that an empty cycle may be performed. The diverter may be any device and/or mechanism that moves the safety stop out of its normal line of rotation so that the safety stop is prevented from contacting the opposing safety stop. The diverter may be an angled piece of material that is in the line of rotation of the safety stop in one direction by is located after an opposing safety stop in an opposing direction.

FIG. 1 illustrates an automatic litter device 2. The automatic litter device 2 includes a chamber 20 having shield 50 that is rotatable with the chamber 20. The chamber 20 is positioned on a support base 100 that assists in rotating the chamber 20. The support base 100 includes a waste drawer 150 so that when the chamber 20 rotates waste is transferred from the chamber 20 to the waste drawer 150. The waste drawer 150 includes a step 152 with a cleaning device 154 so that an animal may use to the step 152 to enter and exit the chamber through the entry opening 22. The automatic litter device 2 includes a bonnet 80 that extends over the chamber 20 and is attached to the support base 100 on both sides of the chamber 20 at an attachment location 94.

Figure 2:
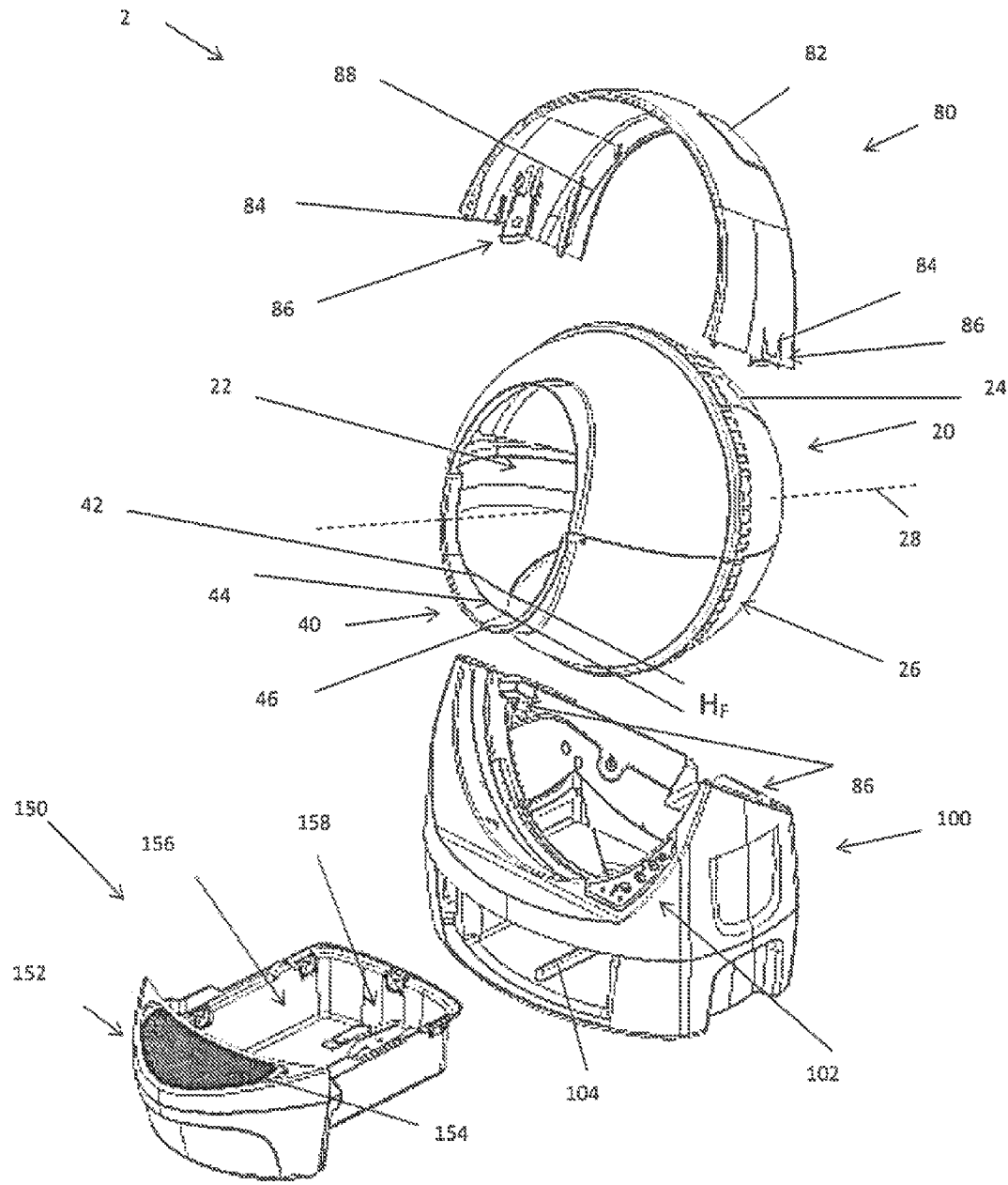
FIG. 2 illustrates an exploded view of the litter device of FIG. 1.

FIG. 2 is an exploded view of the automatic litter device 2 of FIG. 1. A bonnet 80 is illustrated over the chamber 20. The bonnet includes a transparent window 82 so that ambient light may pass through the bonnet 80 and into the chamber 20 through the waste opening 24. The ends of the bonnet 80 connect to the support base 100 by retaining clips 84. The retaining clips 84 hold the bonnet 80 on the support base 100 and complete a circuit with an interlock sensor 86 that detects if the bonnet 80 has been removed and/or loosened and prevents the chamber 20 from rotating. The retaining clips 84 are attached to wiring 88 that extends from the retaining clips 84 to the ambient light sensor (not shown) and lights (not shown). The wiring 88 supplies power to the ambient light sensor so that the ambient light sensor can detect the amount of light passing into the chamber 20 through the transparent window 82 and if the ambient light drops below and/or increases above a predetermined level turn on and/or off the lights. The lights (not shown) supply light into the chamber 20 through the waste opening 24. The chamber 20 has a track 26 that rotates the chamber around an axis of rotation 28. The entry opening 22 of the chamber 20 includes an entry lip 40. The entry lip 40 has a fence 42 that assists in retaining litter (not shown) in the chamber 20. The fence 42 has a height ($H_F$) that is tall enough so that the fence 42 contacts an underside of an animal and encourages the animal to completely enter and/or completely exit the chamber 20. The fence 42 has a drain 44 that allows liquids that are caught on the lip 46 to pass through the fence 42 into the chamber 20. The support base 100 has a control panel 102 for resetting a weight sensor (not shown), rotating the chamber 20, running a cleaning cycle, running an empty cycle, or a combination thereof. The support base 100 has a waste track 104 so that the waste drawer 150 is properly installed in the support base 100. The waste drawer 150 includes a step 152 to assist the animal in entering and exiting the chamber 20. The step 152 has a cleaning device 154 that assists in removing waste, litter, or both from paws of an animal exiting the chamber 20. The waste drawer 150 includes a receptacle area 156 for catching waste, and the receptacle area 156 includes a waste drawer track 158 so that the waste drawer is properly installed on the waste track 104.

Figure 3A:
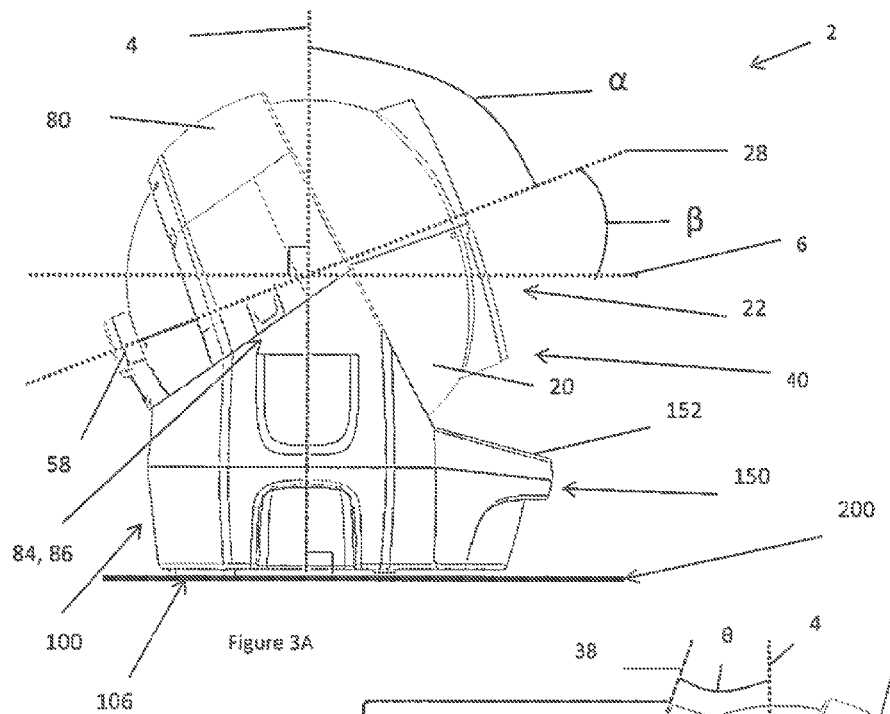
FIG. 3A-B illustrate side views of the litter device of FIG. 1.
Figure 3B:
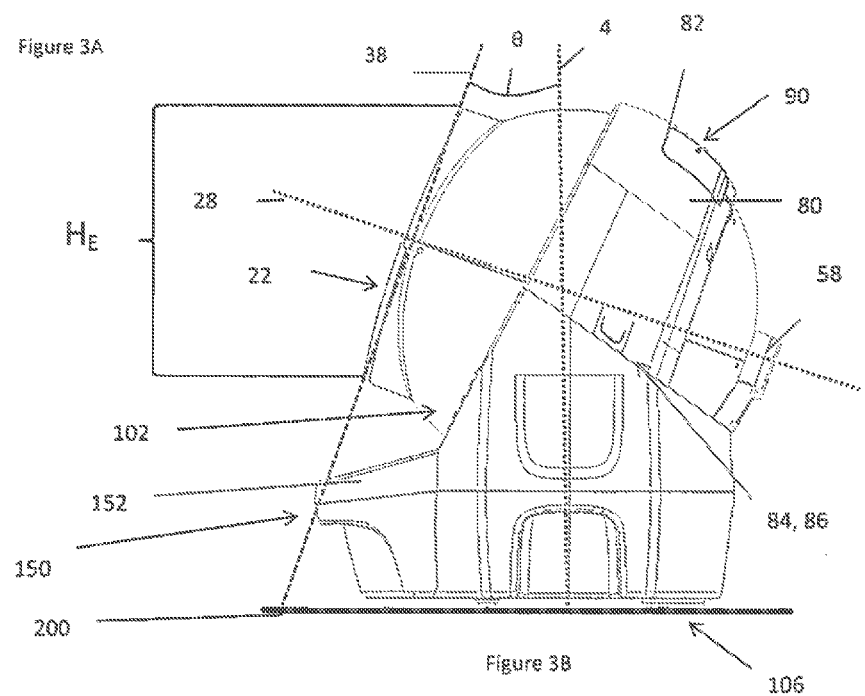

FIG. 3A illustrates a left side view and FIG. 3B illustrates a right side view of the litter device 2. The litter device 2 has a bonnet 80 extending over the chamber 20 and connecting to the support base 100 so that the retaining clips 84 and interlock sensors 86 are complete and power is supplied to the lights and ambient light sensor 90, which receives ambient light through the transparent window 82. The chamber 20 has an entry opening 22 that extends along an entry opening plane 38, which forms an angle (θ) with the vertical plane 4. The entry opening includes an entry lip 40 for preventing waste, fluids, or both from exiting the chamber 20. The entry opening 22 has a height ($H_E$). The chamber 20 rotates around an axis of rotation 28. The axis of rotation 28 forms an angle (α) with vertical which is represented by a vertical plane 4. The axis of rotation 28 forms an angle (β) with a plane 6 that is perpendicular to the vertical plane 4 and is substantially parallel to the surface 200, which the litter device 2 sits upon. The rear of the chamber 20 includes a holder cover 58 that assists in attaching a shield 50 (not shown) to the chamber 20. The support base 100 has a control panel 102, and a weight sensor 106 for sensing the weight of the litter device 2 and its contents. The weight sensor 106 is located under the waste drawer 150. The waste drawer 150 has a step 152.

FIG. 4 illustrates a top view of the litter device 2. As shown a bonnet 80 extends over the chamber 20, and has a transparent window 82 so that ambient light can illuminate the chamber 20. As illustrated the chamber 20 has two halves separated by a chamber plane 14 and the transparent window 82 and waste opening 24 (not shown) are located entirely on one side of the chamber plane 14. The chamber has a holder cover 58 on one side and the opposing side of the chamber 20 includes an entry opening 22 with an entry lip 40. The entry lip 40 includes a fence 42 so that contents of the chamber 20 remain in the chamber 20. The chamber 20 is positioned on a support base 100 that includes a control panel 102 for controlling the litter device 2. The support base 100 has a waste drawer 150 that has a step 152 and a cleaning device 154.

FIG. 5 illustrates a cross-sectional view of the litter device 2. The litter device 2 as has a bonnet 80 covering the chamber 20 and the track 26. The track 26 surrounds the chamber 20 and forms a track plane 12 through the chamber. The track plane 12 has an angle (δ) with the vertical plane 4. The chamber 20 on the inside includes a shield 50 partially covering the screen 30 and septum 32. The shield 50 is attached to the chamber 20 via a retainer 52 that is covered by a holder cover 60 on the outside of the chamber 20. The chamber 20 includes litter 10, and the top of the litter 10 forms a litter plane 8. The litter plane 8 forms an angle (γ) with a plane 6 that is perpendicular to the vertical plane 4. As shown the axis of rotation 28 of the chamber 20 extends through the retainer 52 of the shield 50. The chamber 20 is positioned above the support base 100, and the rear leg of the support base 100 has a weight sensor 106 and a pre-compressed member 108 for measuring the mass of the litter device 2. The support base 100 includes as waste drawer 150 with a receptacle area 156.

Figure 6:
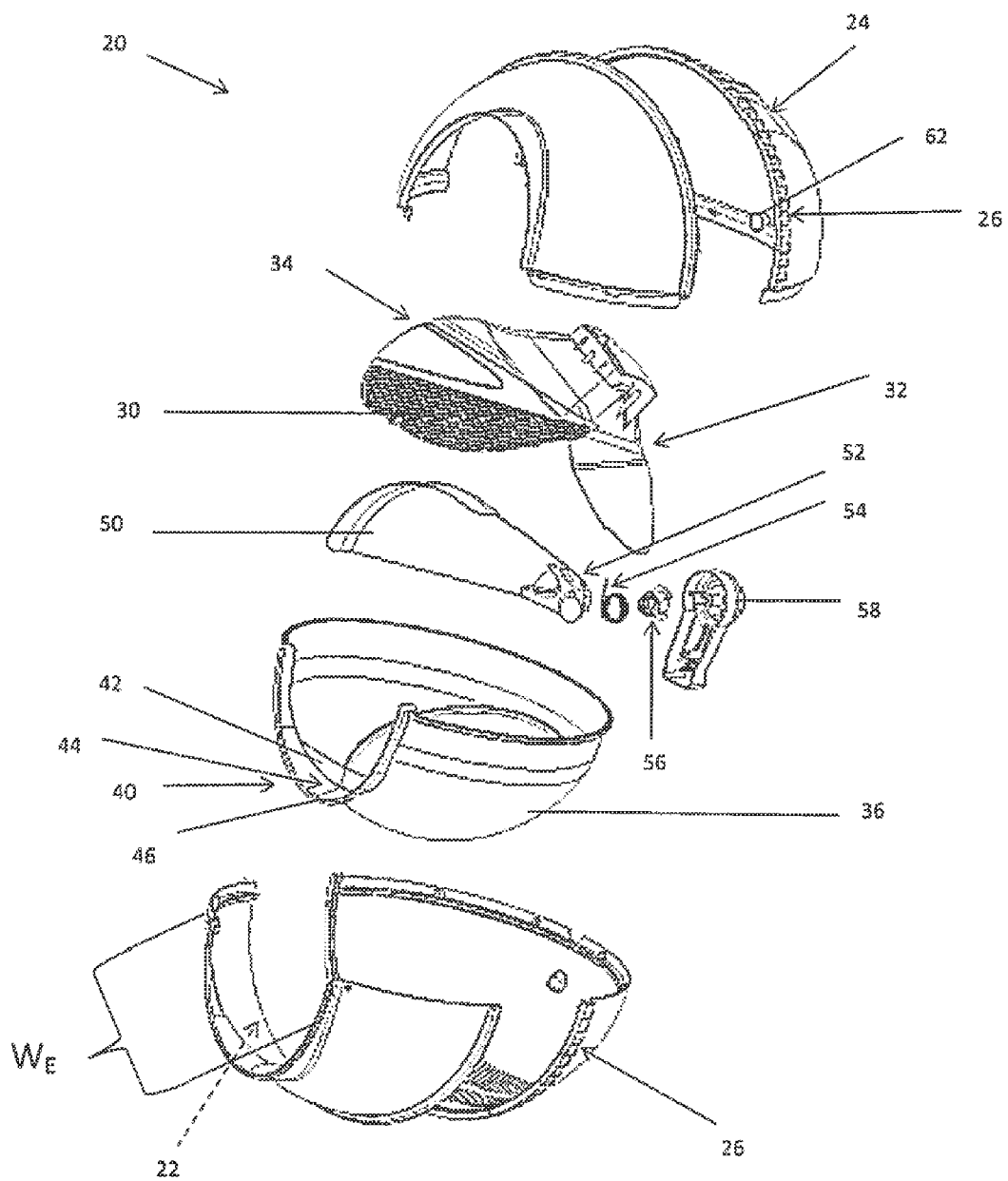
FIG. 6. Illustrates an exploded view of one possible chamber.

FIG. 6 illustrates an exploded view of the chamber 20 and internal components. The outside of the chamber 20 includes a track 26 and a waste opening 24. The entry opening 22 has a width ($W_E$) and includes an entry lip 40. The inside of the chamber 20 has a liner 36, an entry lip 40, a shield 50, a screen 30, and a septum 32. The screen 30 and the septum 32 as illustrated are integrally connected via a living hinge 34. The entry lip 40 sits on and forms to the chamber 20 so that any liquids and/or solids caught by the entry lip 40 may be funneled into the liner 36 and the litter (not shown) during rotation of the chamber. The entry lip 40 has a fence 42, a drain 44 that extends through the fence 42, and a lip 46. The shield 50 includes a shield attachment 52 for attaching the shield 50 to the chamber 20. The shield attachment 52, retainer 56, and a biasing member 54 are connected to the chamber 20. A biasing member 54 is located axially within and between the retainer 56 and the shield 50. A portion of the biasing member 54 is located between the retainer and the holder so that a preload torsional force is created and the shield 50 and retainer 56 are held against a stop within the immovable holder 58 holding the shield 50 static during an initial portion of the chamber 20 rotation until a chamber tab 48 on the chamber 20 comes into contact with a tab on the retainer 56 causing the retainer and shield to follow along with the chamber 20 further winding the biasing member 54 until the chamber 20 stops at the cleaning position. The holder 58 is connected to the support base (not shown) and covers a hole 62 in the chamber 20 wherein the shield attachment 52, biasing member 54, and retainer 56 connect to the chamber 20. The shield 50 partially covers the screen 30 and/or the septum 32 while the chamber is in the home position so that an animal does not contact any residuals that may be on the screen 30 and/or septum 32.

Figure 7:
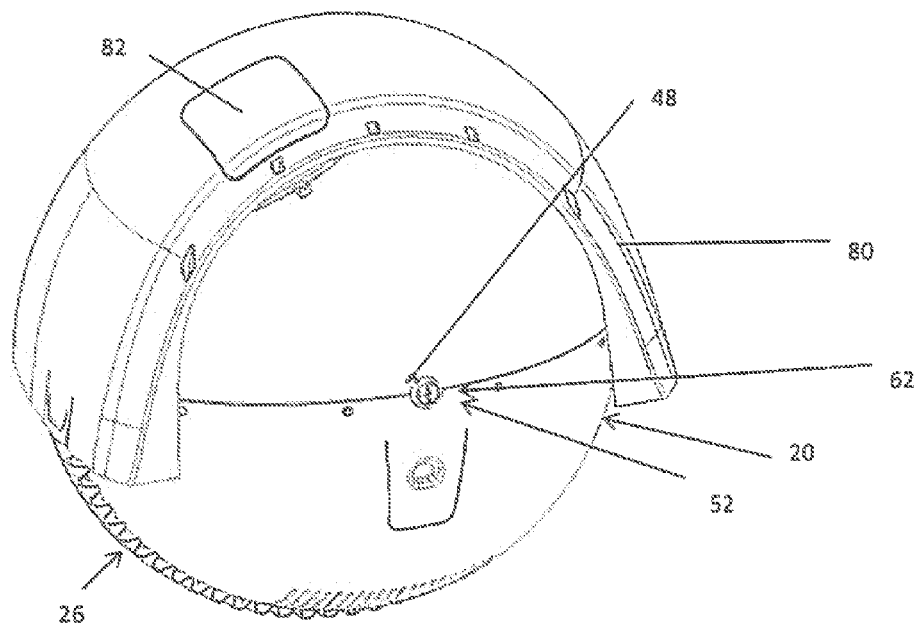
FIG. 7 illustrates a bonnet covering a chamber.

FIG. 7 illustrates a bonnet 80 having a transparent window 82 covering a track 26 around the chamber 20. A rear side of a chamber 20 is illustrated and includes a hole 62 having an integral inner and outer bearing surface. The shield 50 (not shown) is connected to the chamber 20 by the shield attachment 52 extending into the hole 62 of the chamber 20. A chamber tab 48 extends from the slot 62 and contacts a portion of the retainer (not shown) so that the retainer is at least partially rotated during rotation of the chamber 20.

Figure 8:
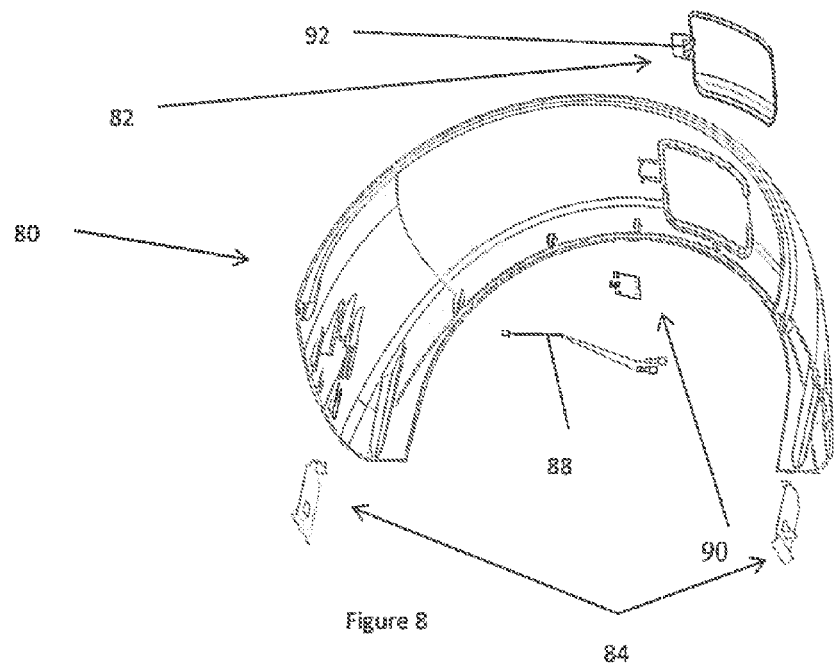
FIG. 8 illustrates an exploded view of one possible bonnet.

FIG. 8 illustrates an exploded view of a bonnet 80. The bonnet has a transparent window 82 with an ambient light sensor 90 and lights 92 located proximate to the transparent window so that the lights can illuminate an inside of a chamber 20 (not shown) through the waste opening 24 (not shown). The ends of the bonnet 80 include retaining clips for attaching the bonnet 80 to a support base 100 (not shown). Wiring 88 transfers power through the retaining clips 84 to the light sensor 90 and the lights 92 so that the lights may illuminate the chamber when the ambient lighting is low.

Figure 9:
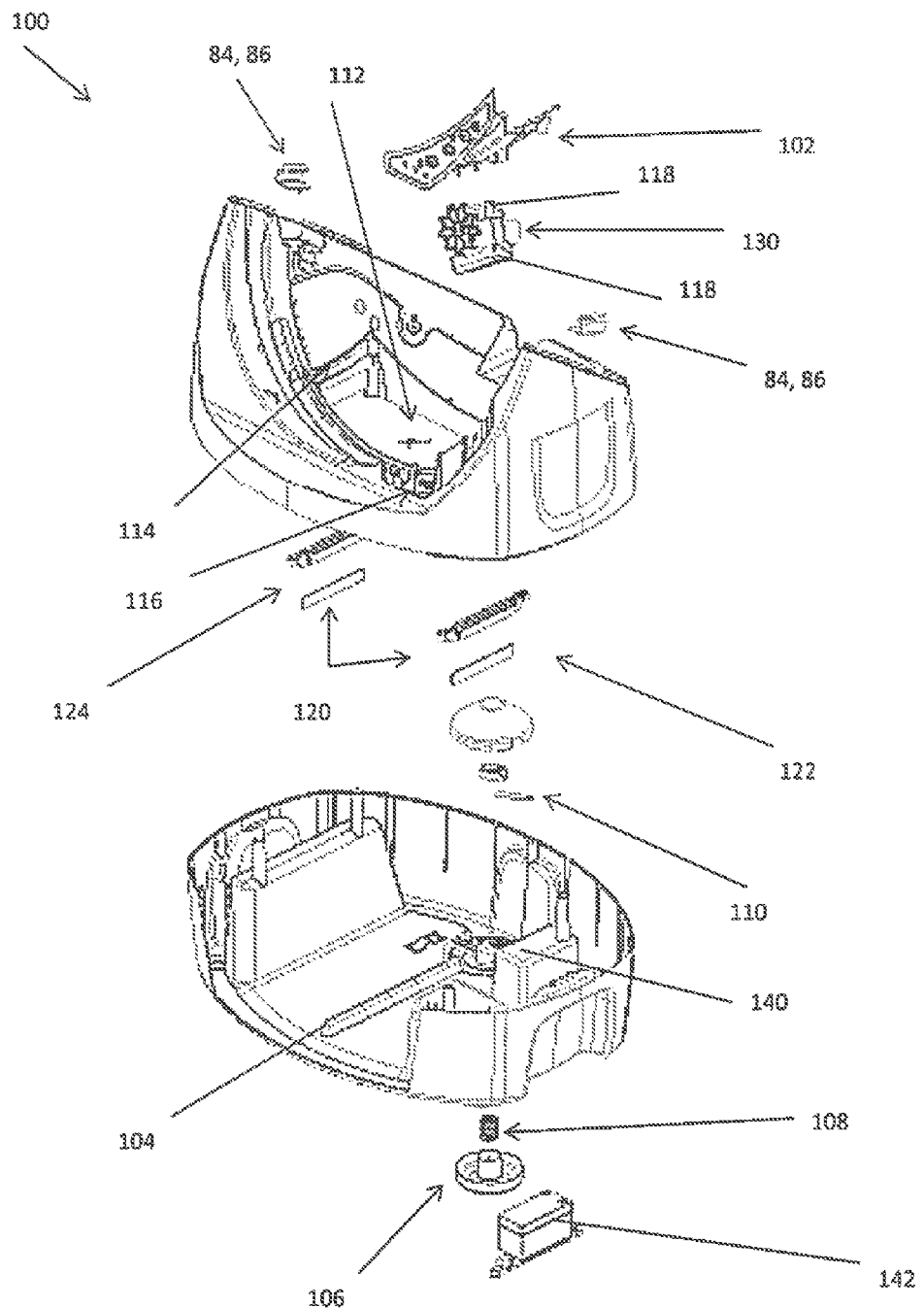
FIG. 9 illustrates an exploded view of one possible support base.

FIG. 9 illustrates an exploded view of a support base 100. The support base includes a control panel 102 for controlling the litter device. The control panel 102 covers a compartment 112 that houses a rotation device 130 for rotating the chamber 20 (not shown). The rotation device 130 extends at least partially through control panel 102 so that the rotation device 130 can rotate the chamber. The compartment 112 houses all of the electronics so that the electronics are protected from moisture, fumes, corrosives, or a combination thereof. The rotation device 130 is in electrical communication with an interlock sensor 86 so that if the bonnet 80 (not shown) is removed and/or loosened the rotation device 130 will not rotate. A safety stop 116 and pinch detector 114 are located within the support base 100 so that the rotation of the chamber is limited. The rotation device 130 is also in electrical communication with a weight sensor 106 so that the rotation device 130 does not rotate while an animal is in the chamber 20 (not shown) but will subsequently rotate once the animal exits the chamber. The weight sensor 106 includes a pre-compressed member 108 in connection with a force sensitive monitoring device 110 so that an increase and/or decrease in weight of the system can be detected by the weight sensor 106. The support base 130 has a waste track 104 so that the waste drawer 150 (not shown) is aligned properly within the litter device so that all of the waste is caught in the waste drawer. An indicator 120 is located above the waste drawer and in electrical communication with the rotation device 130 so that if the waste drawer becomes full the chamber will not be rotated. The indicator 120 includes transmitters 122 on one side of the waste opening and receivers 124 on an opposing side of the waste opening. An isolation mount 118 is located around the rotation device 130 for housing the motor and gear assembly. A battery compartment 140 housing a battery 142 is located proximate to the rotation device 130.

Figure 10:
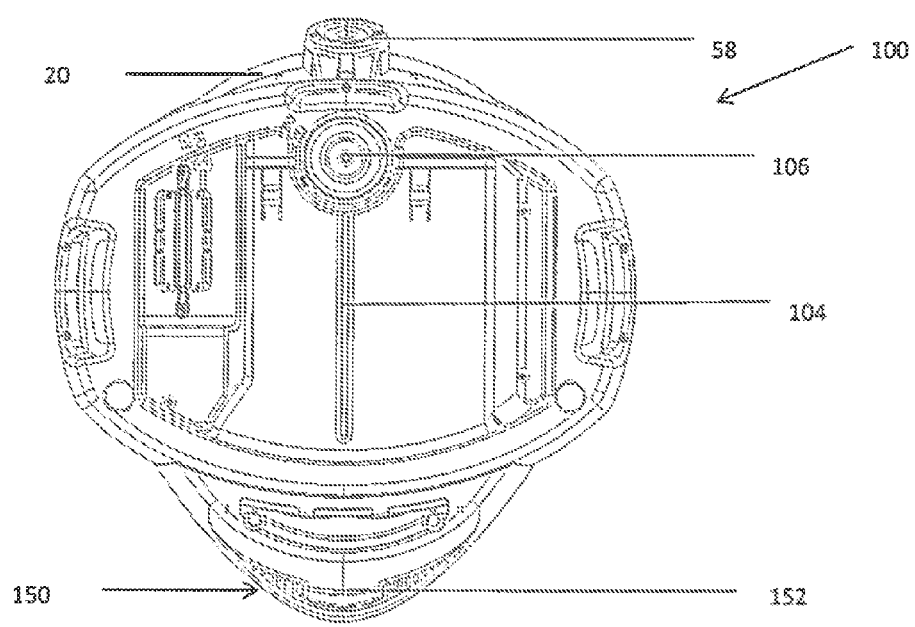
FIG. 10 illustrates a bottom view of a support base.

FIG. 10 is a bottom view of a litter device and especially one possible support base 100. The support base 100 includes a weight sensor 106 and a waste track 104 for the waste drawer 150 to slide upon. The waste drawer 150 includes a step 152. The chamber 20 as shown has a holder 58.

Figure 11:
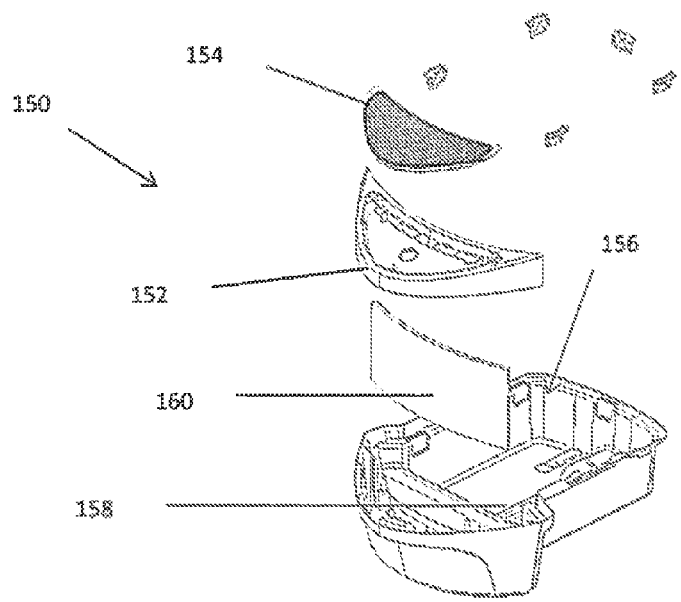
FIG. 11 illustrates an exploded view of one possible waste drawer.

FIG. 11 illustrates one exemplary embodiment of a waste drawer 150. The waste drawer includes a step 152 that is covered by a removable cleaning device 154. The waste drawer has a receptacle area 156 for catching waste and the receptacle area 156 includes a waste drawer track 158. A removable carbon filter 160 is located within the waste drawer for filtering air from the waste drawer 150.

Figure 12A:
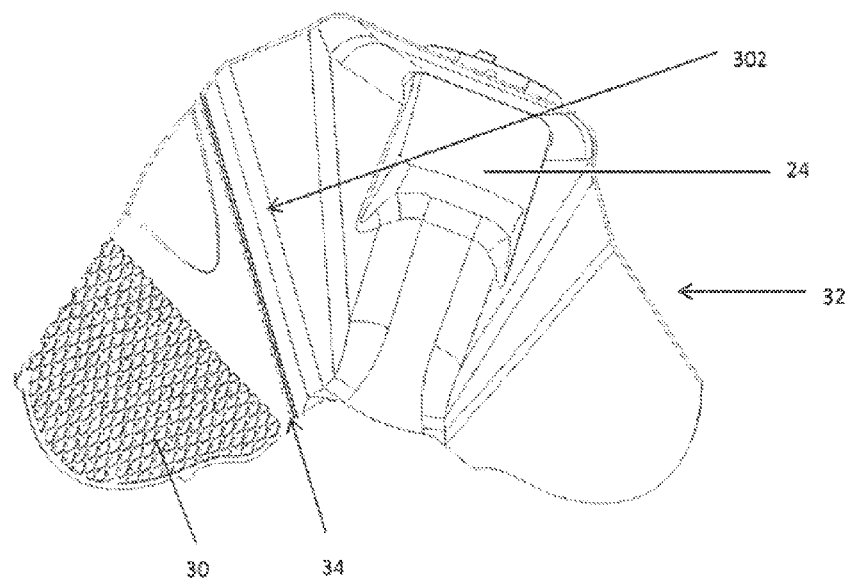
FIGS. 12A-12B illustrate the screen, septum, and living hinge.
Figure 12B:
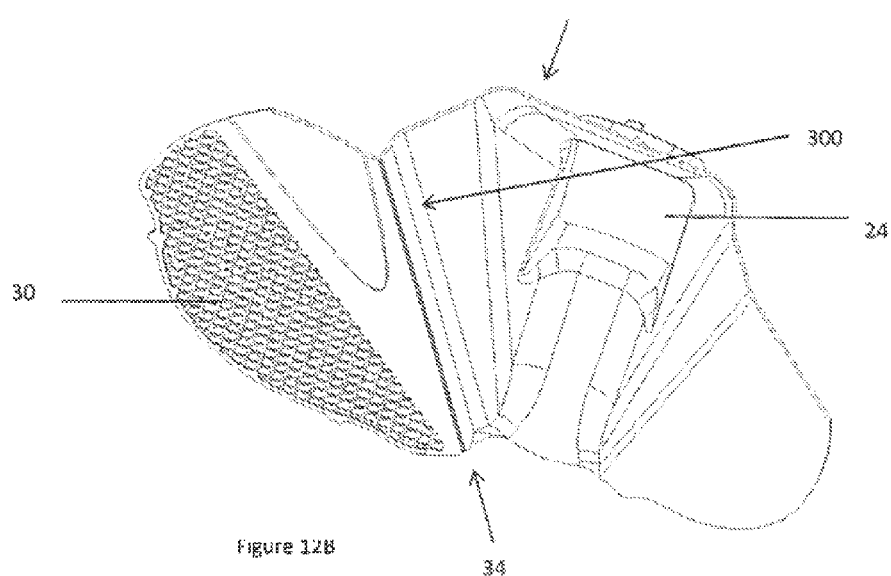

FIGS. 12A and 12B illustrate the screen 30 and septum 32. A living hinge 34 is located between the screen 30 and the septum 32 so that litter is screened during rotation away from the home position and so that the screen moves above the litter during rotation back to the home position so that dust is reduced. FIG. 12B illustrates the living hinge 34 in a cleaning position 300 so that litter passes through the screen 30 and into the septum 32 and waste is screened out and directed towards the waste opening 24. FIG. 12A illustrates the living hinge 34 in a return position 302 where the litter passes under the screen 30 as the litter flows out of the septum 32.

Figure 13A:
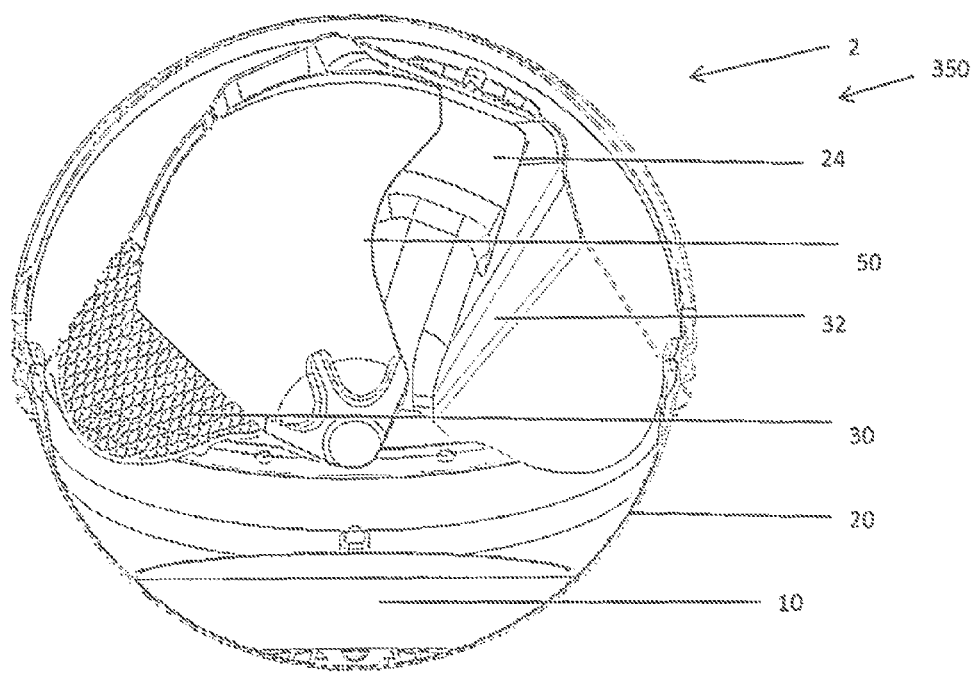
FIGS. 13A-13D illustrate rotation of a chamber from during a cleaning cycle.

FIGS. 13A-13D illustrate a complete cleaning cycle. FIG. 13A illustrates the litter device 2 in the home position 350. The litter 10 when in the home position 350 is ready for use by an animal. The shield 50 covers a portion of the screen 30 and the septum 32 while allowing light to enter the chamber 20 through the waste opening 24.

Figure 13B:
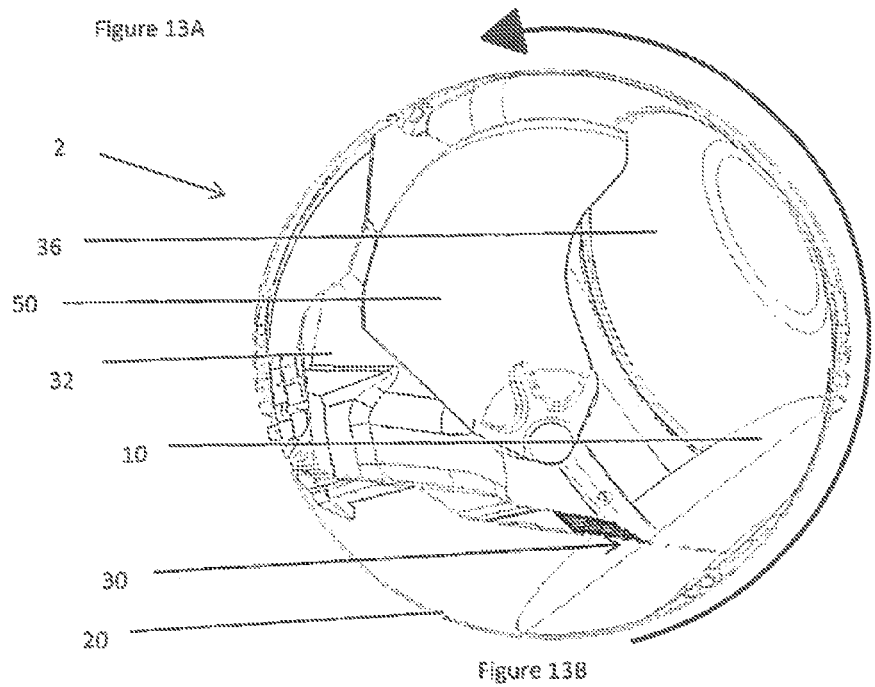

FIG. 13B illustrates the litter device 2 during the initial stages of a cleaning cycle. As shown, the litter device rotates counterclockwise so that the litter 10 is moved off of the liner 36 and into contact with the screen 30. As the litter 10 contacts the screen 30 the screen 30 is moved into contact with an internal wall of the chamber 20 so that the litter and/or waste are separated by the screen 30. The "clean" litter then passes from the screen to the septum 32 where the litter is stored while the waste is removed. As shown the shield 50 remains static so that the area which contacts waste is exposed so that the waste can be removed.

Figure 13C:
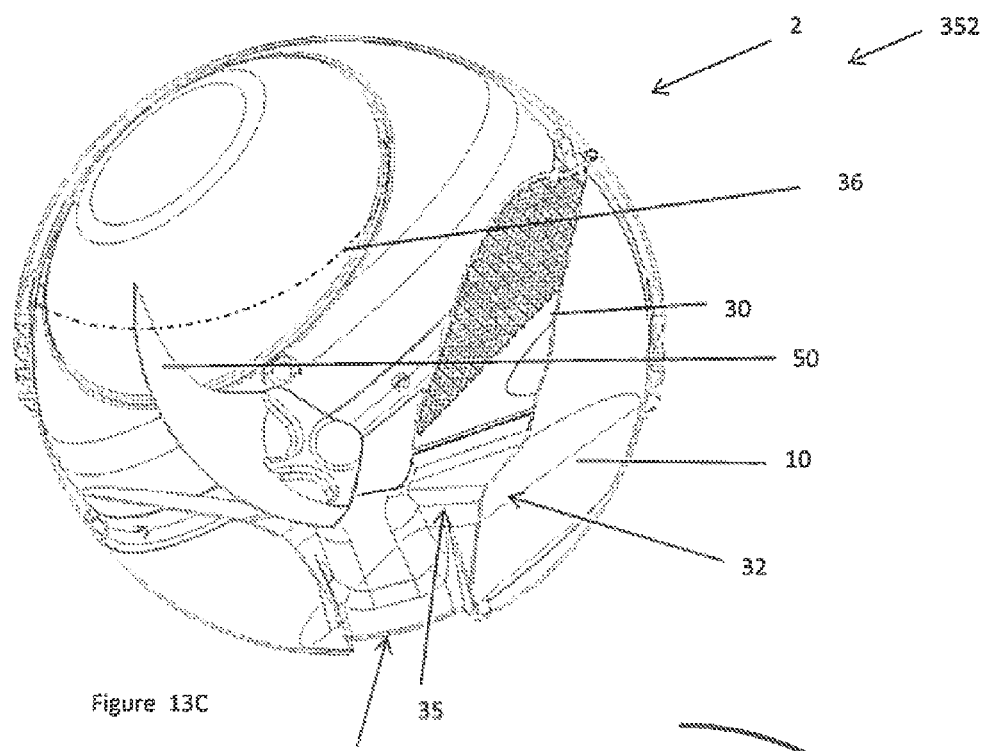

FIG. 13C illustrates the litter device 2 in the waste removal position 352. As illustrated the waste removal position 352 is in the same position as an empty position. The litter 10 has been fully screened and is stored in the septum 32 so that the "clean" litter does not pass through the waste opening 24 into the waste drawer (not shown). The shield 50 is rotated exposing a contact region 35 where waste is funneled along the screen 30 and septum 32 and out of the waste opening 24, and remnants (not shown) may form. The shield 50 is also rotated to a position where the liner 36 falls so that remnants are removed and/or loosened.

Figure 13D:
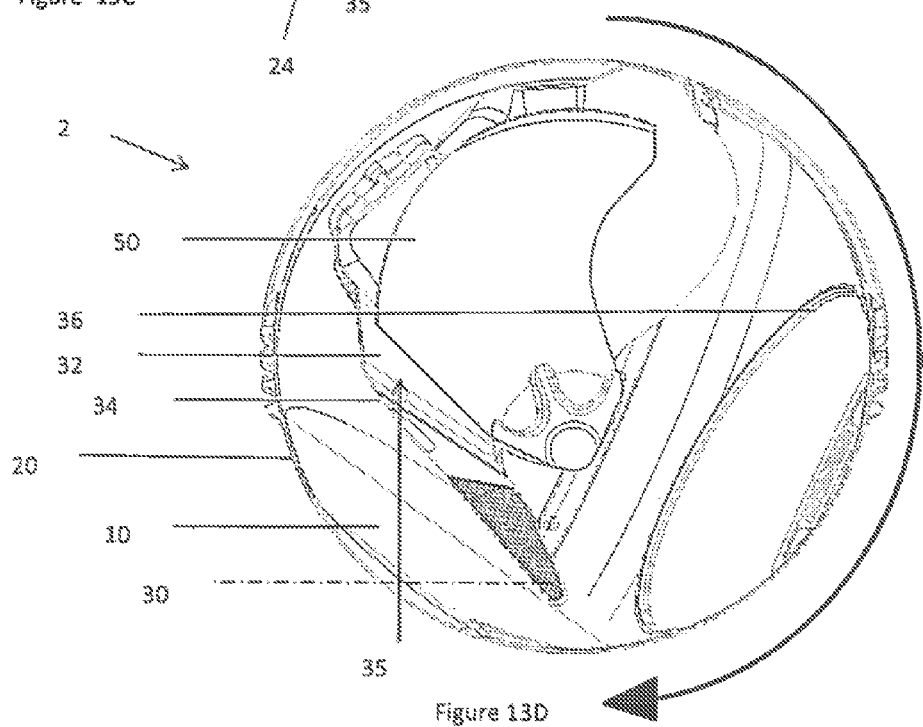

FIG. 13D illustrates a return from the removal position to the home position. The litter device 2 rotates the chamber 20 clockwise so that the litter 10 moves from the septum 32 towards the liner 36. As the chamber 20 rotates the litter pushes the screen 30 away from an internal chamber wall via the living hinge 34 so that the litter 10 passes under the screen 30 to minimize dust. The shield 50 rotates over the contact region 35 so that during use remnants (not shown) are not transferred from the contact region 35 to an animal.

Figure 14:
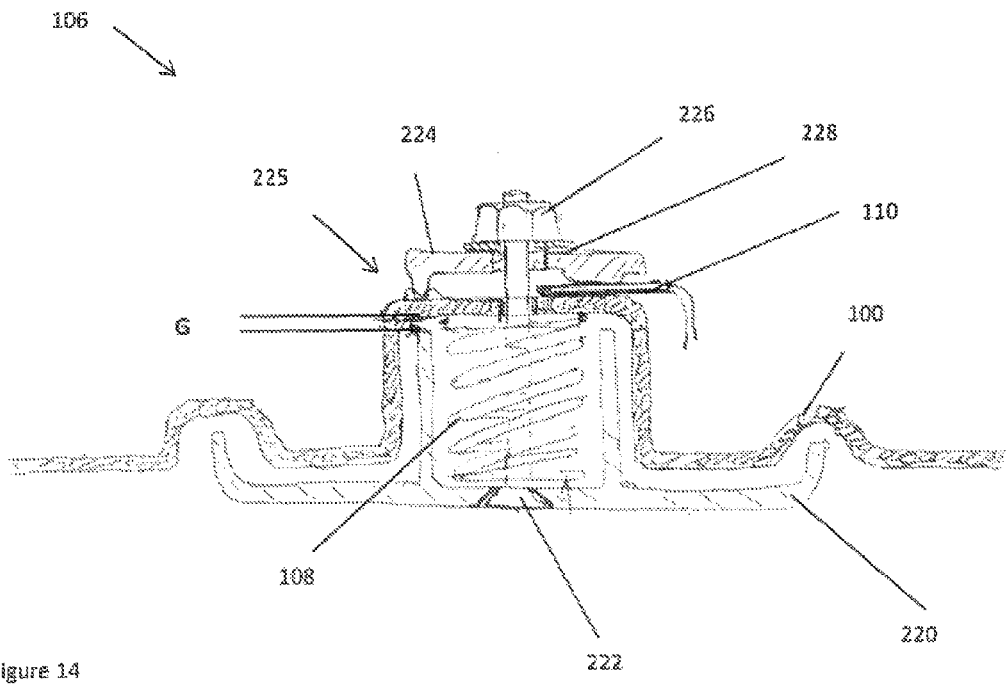
FIG. 14 is a close-up view of one example of an indirect weight sensor.

FIG. 14 illustrates a close-up view of one possible weight sensor 106 located in the litter device of FIG. 5. The weight sensor 106 includes a foot 220 located under the support base 100. The foot 220 is connected to the support base 100 via a fastener 222. The fastener 222 extends through the foot 220 and the support base 100. The fastener 222 extends through a pre-compressed member 108 and assists in retaining the pre-compressed member between the foot 220 and the support base 100. A rocker arm 224 is located above the support base 100 and secured to the support base 100 via a fastener 226 and a washer 228, and one side of the rocker arm 224 forms a pivot point with the support base 100. A force sensitive monitoring device 110 is located between the rocker arm 224 and the support base 100. During initial operation the pre-compressed member 108 has a force so that a gap (G) is created between the foot 220 and the support base 100. The gap (G) assists in providing a force on the rocker arm which produces a force on the force sensitive monitoring device 110. As weight is added to the litter device more force is applied to the support base 100 pushing down on the pre-compressed member 108 so that less force is translated to the force sensitive monitoring device 110. The amount of force the fastener 226 and washer 228 apply to the rocker arm 224 and the amount of force experienced by the force sensitive monitoring device 110 is correlated to indicate a weight change. When weight is removed from the litter device the pre-compressed member 108 pushes the support base 100 away from the foot 220 increasing the amount of force on the rocker arm 224 by the fastener 226 and the washer 228.

Figure 15:
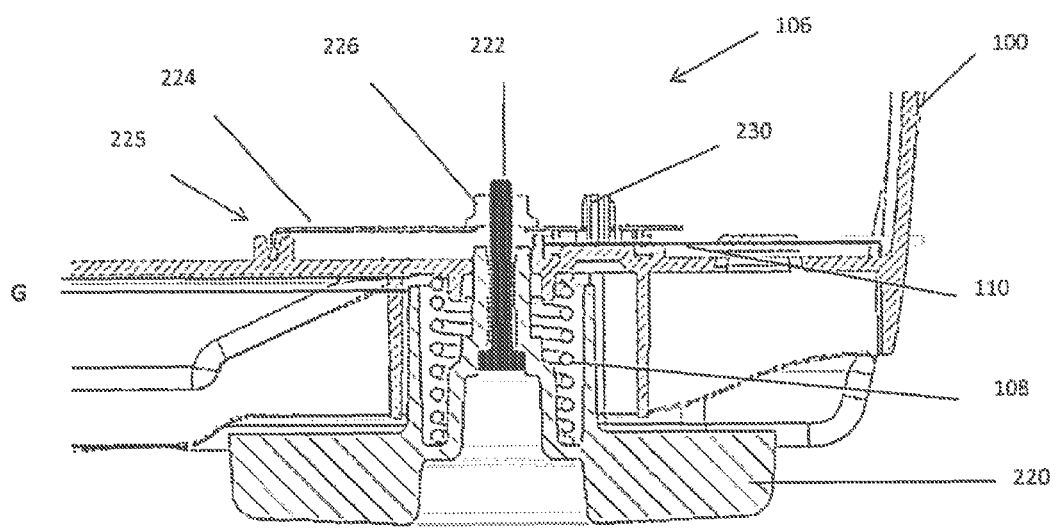
FIG. 15 is a close-up view of another example of an indirect weight sensor.

FIG. 15 illustrates a close-up view of another possible weight sensor 106 located in the litter device of FIG. 5. The weight sensor 160 includes a foot 200 located under the support base 100. The foot 220 is connected to the support base 100 via a fastener 222. The fastener 222 extends through the foot 220 and the support base 100. The fastener 222 extends through a pre-compressed member 108 and assists in retaining the pre-compressed member between the foot 220 and the support base 100. A rocker arm 224 is located above the support base 100 and secured to the support base 100 via a fastener 226, and one side of the rocker arm 224 forms a pivot point with the support base 100. A compressible contact member 230 is located under the rocker arm 224 and above a force sensitive monitoring device 110. The force sensitive monitoring device 110 is located under the compressible contact member 230 and above the support base 100. During initial operation the pre-compressed member 108 has a force so that a gap (G) is created between the foot 220 and the support base 100. The pre-compressed member 108 provides a force on the rocker arm that produces a force on the compressible contact member 230 which ultimately transfers the force to the force sensitive monitoring device 110. As weight is added to the litter device more force is applied to the support base 100 pushing down on the pre-compressed member 108 so that the rocker arm 224 pivots around its pivot point 225 and reduces the amount of force experienced by the force sensitive monitoring device 110 and thus the weight reading increases. When weight is removed from the litter device the pre-compressed member 108 pushes the support base 100 away from the foot 220 increasing the amount of force on the rocker arm 224 by the fastener 226 so that the rocker arm 224 rotates around its pivot point 225. This increases the amount of force applied to the compressible contact member 230 and ultimately the force sensitive monitoring device 110 which translates to a decrease in weight in the litter device.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

We claim:
1. A device comprising:
   a. a support base;
   b. a chamber, located on the support base, wherein the chamber includes:
      i. an entry opening so that an animal can enter and exit the chamber,
      ii. a shield located within and attached to the chamber; wherein the shield is movably attached to the chamber so that the chamber at least partially rotates around the shield and after rotation of the chamber an internal surface of the chamber is covered, wherein the shield is fixedly attached to a retainer which can rotate within a holder that is immovably nested in a slot of the support base, with the retainer held static by a preloaded biasing member located between the retainer and holder until a tab on the chamber comes into contact with a tab on the retainer thus moving the shield and retainer with the chamber and further loading the biasing member.
2. The device according to claim 1, wherein the chamber includes a track, which encircles an outside wall of the chamber, for rotating the chamber around an axis of rotation.

3. The device according to claim 2, wherein the chamber includes a waste opening and the waste opening is located in a well of the chamber on an opposite side of a track plane as the entry opening.

4. The device according to claim 2, wherein the track extends in a track plane, and the chamber includes two halves that are separated by the track plane and normal to the axis of rotation, and the chamber includes a waste opening located entirely on one side of the track plane.

5. The device according to claim 1, wherein the entry opening is an elongated opening having a height and a width forming a height to width ratio of about 1.2:1 or more.

6. The device according to claim 1, wherein the shield is biased so that after rotation of the chamber the shield moves back to a home position, ceases to rotate with the chamber once the shield reaches a home position, or both.

7. The device according to claim 1, wherein the shield rotates during a portion of the rotation of the chamber so that a liner of the chamber drops during the rotation of the chamber without interference by the shield.

8. The device according to claim 1, wherein the shield covers the internal surface of the chamber that contacts waste and/or litter as the waste is directed out of a waste opening so that the animal does not contact the waste and/or litter remnants that may remain on the internal surface of the chamber.

9. A device comprising:
 a. a chamber having an entry opening so that an animal can enter and exit the chamber,
 b. a support base, located under and supporting the chamber, wherein the support base includes:
  i. a weight detection sensor, located in the support base and below the chamber, having:
   1. an expandable and contractable member generating a force on the support base,
   2. a rocker arm, and
   3. a force sensitive monitoring device placed between the support base and the rocker arm,
wherein the expandable and contractible member generates a force on the rocker arm and the rocker arm translates the force to the force sensitive monitoring device so that the force sensitive monitoring device detects changes in weight of the device and wherein the weight detection sensor continuously, intermittently, or both monitors the weight in the chamber and compares the weight in the chamber to a plurality of previous weight measurements, and when the weight detection sensor measures an increase in weight relative to the plurality of previous weight measurements, and then a subsequent weight measurement drops and/or rises, the sensor senses that the animal has entered and subsequently exited the chamber and a cleaning cycle of the device is triggered.

10. The device according to claim 9, wherein the weight detection sensor includes a reset button so that a sensor algorithm is reset to a new baseline when litter is added or removed from the chamber.

11. The device according to claim 9, wherein the weight detection sensor includes a compressible contact member located between the rocker are and the force sensitive monitoring device.

12. The device according to claim 9, wherein the support base includes one or more front legs and one or more rear legs and the weight sensor is located in the one or more rear legs or the one or more front legs so that when an animal enters the chamber the one or more front legs or the one or more rear legs acts as a pivot and pivot the change in weight to the leg that includes the weight sensor.

13. The device according to claim 9, wherein the chamber includes a track, which encircles an outside wall of the chamber, for rotating the chamber around an axis of rotation.

14. The device according to claim 13, wherein the chamber includes a waste opening and the waste opening is located in a wall of the chamber on an opposite side of a track plane as the entry opening.

15. The device according to claim 13, wherein the track extends in a track plane, and the chamber includes two halves that are separated by the track plane and normal to the axis of rotation, and the chamber includes a waste opening located entirely on one side of the track plane.

16. The device according to claim 9, wherein the entry opening is an elongated opening having a height and a width forming a height to width ratio of about 1.2:1 or more.

* * * * *

UNITED STATES PATENT AND TRADEMARK OFFICE
CERTIFICATE OF CORRECTION

| | |
|---|---|
| PATENT NO. | : 8,757,094 B2 |
| APPLICATION NO. | : 13/804370 |
| DATED | : June 24, 2014 |
| INVENTOR(S) | : Brad Baxter |

Page 1 of 1

It is certified that error appears in the above-identified patent and that said Letters Patent is hereby corrected as shown below:

In the Claims

Col. 30, Claim 11, Line 17, "are" should be "arm"

Signed and Sealed this
Twenty-first Day of October, 2014

Michelle K. Lee
*Deputy Director of the United States Patent and Trademark Office*